(12) United States Patent
Steinberg

(10) Patent No.: US 10,216,927 B1
(45) Date of Patent: Feb. 26, 2019

(54) SYSTEM AND METHOD FOR PROTECTING MEMORY PAGES ASSOCIATED WITH A PROCESS USING A VIRTUALIZATION LAYER

(71) Applicant: FireEye, Inc., Milpitas, CA (US)

(72) Inventor: Udo Steinberg, Braunschweig (DE)

(73) Assignee: FireEye, Inc., Milpitas, CA (US)

( * ) Notice: Subject to any disclaimer, the term of this patent is extended or adjusted under 35 U.S.C. 154(b) by 220 days.

(21) Appl. No.: 15/199,879

(22) Filed: Jun. 30, 2016

Related U.S. Application Data

(60) Provisional application No. 62/187,145, filed on Jun. 30, 2015.

(51) Int. Cl.
*G06F 11/14* (2006.01)
*G06F 12/00* (2006.01)
*G06F 21/53* (2013.01)
*G06F 12/14* (2006.01)
*G06F 9/455* (2018.01)

(52) U.S. Cl.
CPC .......... *G06F 21/53* (2013.01); *G06F 9/45558* (2013.01); *G06F 12/1425* (2013.01); *G06F 2009/45587* (2013.01); *G06F 2212/1052* (2013.01); *G06F 2221/2149* (2013.01)

(58) Field of Classification Search
CPC ...... G06F 12/00; G06F 11/14; G06F 11/1446; G06F 11/1448; G06F 11/1458; G06F 13/00
See application file for complete search history.

(56) References Cited

U.S. PATENT DOCUMENTS

| 5,878,560 A | 3/1999 | Johnson |
| 6,013,455 A | 1/2000 | Bandman et al. |
| 7,058,791 B1 * | 6/2006 | Hughes .................. G06F 12/04 712/229 |
| 7,424,745 B2 | 9/2008 | Cheston et al. |

(Continued)

FOREIGN PATENT DOCUMENTS

| WO | 2011/112348 A1 | 9/2011 |
| WO | 2012135192 A2 | 10/2012 |

(Continued)

OTHER PUBLICATIONS

U.S. Appl. No. 15/199,873, filed Jun. 30, 2016 Non-Final Office Action dated Feb. 9, 2018.

(Continued)

*Primary Examiner* — Tuan V Thai
(74) *Attorney, Agent, or Firm* — Rutan & Tucker, LLP

(57) ABSTRACT

A computerized method is provided for protecting processes operating within a computing device. The method comprises an operation for identifying, by a virtualization layer operating in a host mode, when a guest process switch has occurred. The guest process switch corresponds to a change as to an operating state of a process within a virtual machine. Responsive to an identified guest process switch, an operation is conducted to determine, by the virtualization layer, whether hardware circuitry within the computing device is to access a different nested page table for use in memory address translations. The different nested page table alters page permissions for one or more memory pages associated with at least the process that are executable in the virtual machine.

20 Claims, 6 Drawing Sheets

(56) References Cited

U.S. PATENT DOCUMENTS

| | | |
|---|---|---|
| 7,937,387 B2 | 5/2011 | Frazier et al. |
| 7,958,558 B1 | 6/2011 | Leake et al. |
| 7,996,836 B1 | 8/2011 | McCorkendale et al. |
| 8,006,305 B2 | 8/2011 | Aziz |
| 8,010,667 B2 | 8/2011 | Zhang et al. |
| 8,069,484 B2 | 11/2011 | McMillan et al. |
| 8,151,263 B1 | 4/2012 | Venkitachalam et al. |
| 8,171,553 B2 | 5/2012 | Aziz et al. |
| 8,201,169 B2 | 6/2012 | Venkitachalam et al. |
| 8,204,984 B1 | 6/2012 | Aziz et al. |
| 8,233,882 B2 | 7/2012 | Rogel |
| 8,271,978 B2 | 9/2012 | Bennett et al. |
| 8,290,912 B1 | 10/2012 | Searls et al. |
| 8,291,499 B2 | 10/2012 | Aziz et al. |
| 8,332,571 B1 | 12/2012 | Edwards, Sr. |
| 8,353,031 B1 | 1/2013 | Rajan et al. |
| 8,375,444 B2 | 2/2013 | Aziz et al. |
| 8,387,046 B1 | 2/2013 | Montague et al. |
| 8,397,306 B1 | 3/2013 | Tormasov |
| 8,418,230 B1 | 4/2013 | Cornelius et al. |
| 8,479,276 B1 | 7/2013 | Vaystikh et al. |
| 8,479,294 B1 | 7/2013 | Li et al. |
| 8,510,827 B1 | 8/2013 | Leake et al. |
| 8,516,593 B2 | 8/2013 | Aziz |
| 8,522,236 B2 | 8/2013 | Zimmer et al. |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,239 B2 | 11/2013 | Aziz et al. |
| 8,635,696 B1 | 1/2014 | Aziz |
| 8,689,333 B2 | 4/2014 | Aziz |
| 8,713,681 B2 | 4/2014 | Silberman et al. |
| 8,756,696 B1 | 6/2014 | Miller |
| 8,775,715 B2 | 7/2014 | Tsirkin et al. |
| 8,776,180 B2 | 7/2014 | Kumar et al. |
| 8,776,229 B1 | 7/2014 | Aziz |
| 8,793,278 B2 | 7/2014 | Frazier et al. |
| 8,793,787 B2 | 7/2014 | Ismael et al. |
| 8,799,997 B2 | 8/2014 | Spiers et al. |
| 8,805,947 B1 | 8/2014 | Kuzkin et al. |
| 8,832,352 B2 | 9/2014 | Tsirkin et al. |
| 8,832,829 B2 | 9/2014 | Manni et al. |
| 8,839,245 B1 | 9/2014 | Khajuria et al. |
| 8,850,060 B1 | 9/2014 | Beloussov et al. |
| 8,850,571 B2 | 9/2014 | Staniford et al. |
| 8,863,279 B2 | 10/2014 | McDougal et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,910,238 B2 | 12/2014 | Lukacs et al. |
| 8,935,779 B2 | 1/2015 | Manni et al. |
| 8,949,257 B2 | 2/2015 | Shiffer et al. |
| 8,984,478 B2 | 3/2015 | Epstein |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,003,402 B1 | 4/2015 | Carbone et al. |
| 9,009,822 B1 | 4/2015 | Ismael et al. |
| 9,009,823 B1 | 4/2015 | Ismael et al. |
| 9,027,125 B2 | 5/2015 | Kumar et al. |
| 9,027,135 B1 | 5/2015 | Aziz |
| 9,071,638 B1 | 6/2015 | Aziz et al. |
| 9,087,199 B2 | 7/2015 | Sallam |
| 9,092,616 B2 | 7/2015 | Kumar et al. |
| 9,092,625 B1 | 7/2015 | Kashyap et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,117,079 B1 | 8/2015 | Huang et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,213,651 B2 | 12/2015 | Malyugin et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |

(56) References Cited

U.S. PATENT DOCUMENTS

| | | |
|---|---|---|
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 2006/0112416 A1 | 5/2006 | Ohta et al. |
| 2006/0130060 A1 | 6/2006 | Anderson et al. |
| 2006/0236127 A1 | 10/2006 | Kurien et al. |
| 2006/0248528 A1 | 11/2006 | Oney et al. |
| 2007/0006226 A1 | 1/2007 | Hendel |
| 2007/0250930 A1 | 10/2007 | Aziz et al. |
| 2007/0300227 A1 | 12/2007 | Mall et al. |
| 2008/0005782 A1 | 1/2008 | Aziz |
| 2008/0065854 A1 | 3/2008 | Schoenberg et al. |
| 2008/0123676 A1 | 5/2008 | Cummings et al. |
| 2008/0127348 A1 | 5/2008 | Largman et al. |
| 2008/0184367 A1 | 7/2008 | McMillan et al. |
| 2008/0184373 A1 | 7/2008 | Traut et al. |
| 2008/0235793 A1 | 9/2008 | Schunter et al. |
| 2008/0244569 A1 | 10/2008 | Challener et al. |
| 2008/0294808 A1 | 11/2008 | Mahalingam et al. |
| 2008/0320594 A1 | 12/2008 | Jiang |
| 2009/0007100 A1 | 1/2009 | Field et al. |
| 2009/0036111 A1 | 2/2009 | Danford et al. |
| 2009/0044024 A1 | 2/2009 | Oberheide et al. |
| 2009/0044274 A1 | 2/2009 | Budko et al. |
| 2009/0089860 A1 | 4/2009 | Forrester et al. |
| 2009/0106754 A1 | 4/2009 | Liu et al. |
| 2009/0113425 A1 | 4/2009 | Ports et al. |
| 2009/0158432 A1 | 6/2009 | Zheng et al. |
| 2009/0172661 A1 | 7/2009 | Zimmer et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0204964 A1 | 8/2009 | Foley et al. |
| 2009/0276771 A1 | 11/2009 | Nickolov et al. |
| 2009/0320011 A1 | 12/2009 | Chow et al. |
| 2009/0328221 A1 | 12/2009 | Blumfield et al. |
| 2010/0030996 A1 | 2/2010 | Butler, II |
| 2010/0031360 A1 | 2/2010 | Seshadri et al. |
| 2010/0043073 A1 | 2/2010 | Kuwamura |
| 2010/0100718 A1 | 4/2010 | Srinivasan |
| 2010/0115621 A1 | 5/2010 | Staniford et al. |
| 2010/0191888 A1 | 7/2010 | Serebrin et al. |
| 2010/0192223 A1 | 7/2010 | Ismael et al. |
| 2010/0235647 A1 | 9/2010 | Buer |
| 2010/0254622 A1 | 10/2010 | Kamay et al. |
| 2010/0299665 A1 | 11/2010 | Adams |
| 2010/0306173 A1 | 12/2010 | Frank |
| 2010/0306560 A1 | 12/2010 | Bozek et al. |
| 2011/0004935 A1 | 1/2011 | Moffie et al. |
| 2011/0022695 A1 | 1/2011 | Dalal et al. |
| 2011/0047542 A1 | 2/2011 | Dang et al. |
| 2011/0047544 A1 | 2/2011 | Yehuda et al. |
| 2011/0060947 A1 | 3/2011 | Song et al. |
| 2011/0078794 A1 | 3/2011 | Manni et al. |
| 2011/0078797 A1 | 3/2011 | Beachem et al. |
| 2011/0082962 A1 | 4/2011 | Horovitz et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0153909 A1 | 6/2011 | Dong |
| 2011/0167422 A1 | 7/2011 | Eom et al. |
| 2011/0173213 A1 | 7/2011 | Frazier et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0296412 A1 | 12/2011 | Banga et al. |
| 2011/0296440 A1 | 12/2011 | Laurich et al. |
| 2011/0299413 A1 | 12/2011 | Chatwani et al. |
| 2011/0314546 A1 | 12/2011 | Aziz et al. |
| 2011/0321040 A1 | 12/2011 | Sobel et al. |
| 2011/0321165 A1 | 12/2011 | Capalik et al. |
| 2011/0321166 A1 | 12/2011 | Capalik et al. |
| 2012/0011508 A1 | 1/2012 | Ahmad |
| 2012/0047576 A1 | 2/2012 | Do et al. |
| 2012/0117652 A1 | 5/2012 | Manni et al. |
| 2012/0131156 A1 | 5/2012 | Brandt et al. |
| 2012/0144489 A1 | 6/2012 | Jarrett et al. |
| 2012/0159454 A1 | 6/2012 | Barham et al. |
| 2012/0174186 A1 | 7/2012 | Aziz et al. |
| 2012/0174218 A1 | 7/2012 | McCoy et al. |
| 2012/0198514 A1 | 8/2012 | McCune et al. |
| 2012/0216046 A1 | 8/2012 | McDougal et al. |
| 2012/0222114 A1 | 8/2012 | Shanbhogue |
| 2012/0222121 A1 | 8/2012 | Staniford et al. |
| 2012/0254995 A1 | 10/2012 | Sallam |
| 2012/0255002 A1 | 10/2012 | Sallam |
| 2012/0255003 A1 | 10/2012 | Sallam |
| 2012/0255012 A1 | 10/2012 | Sallam |
| 2012/0255015 A1 | 10/2012 | Sahita et al. |
| 2012/0255016 A1 | 10/2012 | Sallam |
| 2012/0255017 A1 | 10/2012 | Sallam |
| 2012/0255021 A1 | 10/2012 | Sallam |
| 2012/0260345 A1 | 10/2012 | Quinn et al. |
| 2012/0265976 A1 | 10/2012 | Spiers et al. |
| 2012/0291029 A1 | 11/2012 | Kidambi et al. |
| 2012/0297057 A1 | 11/2012 | Ghosh et al. |
| 2012/0311708 A1 | 12/2012 | Agarwal et al. |
| 2012/0317566 A1 | 12/2012 | Santos et al. |
| 2012/0331553 A1 | 12/2012 | Aziz et al. |
| 2013/0036470 A1 | 2/2013 | Zhu et al. |
| 2013/0036472 A1 | 2/2013 | Aziz |
| 2013/0047257 A1 | 2/2013 | Aziz |
| 2013/0055256 A1 | 2/2013 | Banga et al. |
| 2013/0086235 A1 | 4/2013 | Ferris |
| 2013/0086299 A1* | 4/2013 | Epstein ............... G06F 12/1475 711/6 |
| 2013/0091571 A1 | 4/2013 | Lu |
| 2013/0111593 A1 | 5/2013 | Shankar et al. |
| 2013/0117741 A1 | 5/2013 | Prabhakaran et al. |
| 2013/0117848 A1 | 5/2013 | Golshan et al. |
| 2013/0117849 A1 | 5/2013 | Golshan et al. |
| 2013/0179971 A1 | 7/2013 | Harrison |
| 2013/0191924 A1 | 7/2013 | Tedesco et al. |
| 2013/0227680 A1 | 8/2013 | Pavlyushchik |
| 2013/0227691 A1 | 8/2013 | Aziz et al. |
| 2013/0247186 A1 | 9/2013 | LeMasters |
| 2013/0282776 A1 | 10/2013 | Durrant et al. |
| 2013/0283370 A1 | 10/2013 | Vipat et al. |
| 2013/0291109 A1 | 10/2013 | Staniford et al. |
| 2013/0298243 A1 | 11/2013 | Kumar et al. |
| 2013/0298244 A1 | 11/2013 | Kumar et al. |
| 2013/0312098 A1 | 11/2013 | Kapoor et al. |
| 2013/0312099 A1 | 11/2013 | Edwards et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0326625 A1 | 12/2013 | Anderson et al. |
| 2013/0333033 A1 | 12/2013 | Khesin |
| 2013/0333040 A1 | 12/2013 | Diehl et al. |
| 2013/0347131 A1 | 12/2013 | Mooring et al. |
| 2014/0006734 A1 | 1/2014 | Li et al. |
| 2014/0019963 A1 | 1/2014 | Deng et al. |
| 2014/0032875 A1 | 1/2014 | Butler |
| 2014/0075522 A1 | 3/2014 | Paris et al. |
| 2014/0089266 A1 | 3/2014 | Une et al. |
| 2014/0096134 A1 | 4/2014 | Barak et al. |
| 2014/0115578 A1 | 4/2014 | Cooper et al. |
| 2014/0115652 A1 | 4/2014 | Kapoor et al. |
| 2014/0130158 A1 | 5/2014 | Wang et al. |

(56) References Cited

U.S. PATENT DOCUMENTS

| | | |
|---|---|---|
| 2014/0137180 A1 | 5/2014 | Lukacs et al. |
| 2014/0157407 A1 | 6/2014 | Krishnan et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0208123 A1 | 7/2014 | Roth et al. |
| 2014/0230024 A1 | 8/2014 | Uehara et al. |
| 2014/0237600 A1 | 8/2014 | Silberman et al. |
| 2014/0259169 A1 | 9/2014 | Harrison |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0289105 A1 | 9/2014 | Sirota et al. |
| 2014/0304819 A1 | 10/2014 | Ignatchenko et al. |
| 2014/0310810 A1 | 10/2014 | Brueckner et al. |
| 2014/0325644 A1 | 10/2014 | Oberg et al. |
| 2014/0337836 A1 | 11/2014 | Ismael |
| 2014/0344926 A1 | 11/2014 | Cunningham et al. |
| 2014/0351810 A1 | 11/2014 | Pratt et al. |
| 2014/0359239 A1 | 12/2014 | Hiremane et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0013008 A1* | 1/2015 | Lukacs .............. G06F 21/53 726/24 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0121135 A1 | 4/2015 | Pape |
| 2015/0128266 A1 | 5/2015 | Tosa |
| 2015/0172300 A1 | 6/2015 | Cochenour |
| 2015/0180886 A1 | 6/2015 | Staniford et al. |
| 2015/0186645 A1 | 7/2015 | Aziz et al. |
| 2015/0199514 A1 | 7/2015 | Tosa et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0244732 A1 | 8/2015 | Golshan et al. |
| 2015/0317495 A1 | 11/2015 | Rodgers et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0048680 A1 | 2/2016 | Lutas et al. |
| 2016/0057123 A1 | 2/2016 | Jiang et al. |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2017/0213030 A1 | 7/2017 | Mooring et al. |
| 2018/0013770 A1 | 1/2018 | Ismael |
| 2018/0048660 A1 | 2/2018 | Paithane et al. |

FOREIGN PATENT DOCUMENTS

| | | |
|---|---|---|
| WO | 2012154664 A2 | 11/2012 |
| WO | 2012177464 A1 | 12/2012 |
| WO | 2013/067505 A1 | 5/2013 |
| WO | 2013091221 A1 | 6/2013 |
| WO | 2014004747 A2 | 1/2014 |

OTHER PUBLICATIONS

U.S. Appl. No. 15/199,876, filed Jun. 30, 2016 Non-Final Office Action dated Jan. 10, 2018.

* cited by examiner

SYSTEM AND METHOD FOR PROTECTING MEMORY PAGES ASSOCIATED WITH A PROCESS USING A VIRTUALIZATION LAYER

CROSS REFERENCE TO RELATED APPLICATIONS

This application is based upon and claims the benefit of priority from U.S. Provisional Patent Application No. 62/187,145 filed Jun. 30, 2015, the entire contents of which are incorporated herein by reference.

FIELD

Embodiments of the disclosure relate to the field of malware detection. More specifically, one embodiment of the disclosure relates to a hypervisor-based, malware detection architecture.

GENERAL BACKGROUND

In general, virtualization is a technique for hosting different guest operating systems concurrently on the same computing platform. With the emergence of hardware support for full virtualization in an increased number of hardware processor architectures, new software virtualization architectures have emerged. One such virtualization technique involves adding a software abstraction layer, sometimes referred to as a virtualization layer, between the physical hardware and a virtual machine (referred to as "VM").

A VM is a software abstraction that operates like a physical (real) computing device having a particular operating system. A VM typically features pass-through physical and/or emulated virtual system hardware, and guest system software. The virtual system hardware is implemented as software components in the host (e.g., virtual central processing unit "vCPU" or virtual disk) that are configured to operate in a similar manner as corresponding physical components (e.g., physical CPU or hard disk). The guest system software, when executed, controls operations inside the VM, such as the execution and allocation of virtual resources, so that the VM operates in a manner consistent to operations of the physical computing device. As a result, the software virtualization architecture allows for a computing device, which may be running one type of "host" operating system (OS), to support a VM that operates like another computing device that is running another OS type.

Over the last few years, while efforts have been made to improve functionality of VMs, the overall logical architecture of the virtualization layer has experienced little change. The virtualization layer includes a hypervisor, the most privileged component of the virtualization software stack, which runs on top of the hardware resources. The virtualization layer functions similar to an OS kernel—abstracting the underlying hardware resources and isolating software components running on the hypervisor.

While able to access low-level context data (e.g., register values, etc.) from the guest operating system (guest OS) residing in the VM, the virtualization layer is unable to discern higher level context concerning the guest processes, such as the particular type and/or version of the application associated with the active guest process running in the VM. Stated differently, from the context data, the virtualization layer is unable to discern whether the active process pertains to a particular type/version of web browser application (e.g., FireFox® browser, version 24.7) or a particular type/version of a Portable Document Format (PDF) reader (e.g., Adobe® Reader, version 10) for example. Additionally, although the virtualization layer has access to stored data within the entire virtual memory, without additional metadata, it is unable to discern whether that stored data is associated with a process stack or a critical OS data structure.

As a result, the virtualization layer relies on additional data delivery schemes to obtain metadata associated with guest processes running in the VM. One data delivery scheme instruments an event monitoring process as part of or operating in conjunction with the guest OS. This software component, sometimes referred to as a "guest agent," is configured to provide the virtualization layer with metadata that may assist in the handling of exploit detection. For instance, depending on the OS-type, a particular guest agent may be instrumented into or operating in conjunction with the guest OS and, in response to at least one selected event, provides metadata to the virtualization layer.

Despite having an immense value in exploit detection, the guest agent remains generally unsecure as there are no mechanisms within the software virtualization architecture to protect the integrity, confidentiality and availability of the guest agent. When operating inside the guest OS, the guest agent is at the same privilege level as potential malware being processed within the VM. Hence, the guest agent is highly susceptible to a malicious attack. The loss of proper guest agent functionality may result in a loss of semantic information for the virtualization layer, which may degrade its exploit detection and guest process protection abilities.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

I. Introduction

Figure 1A:
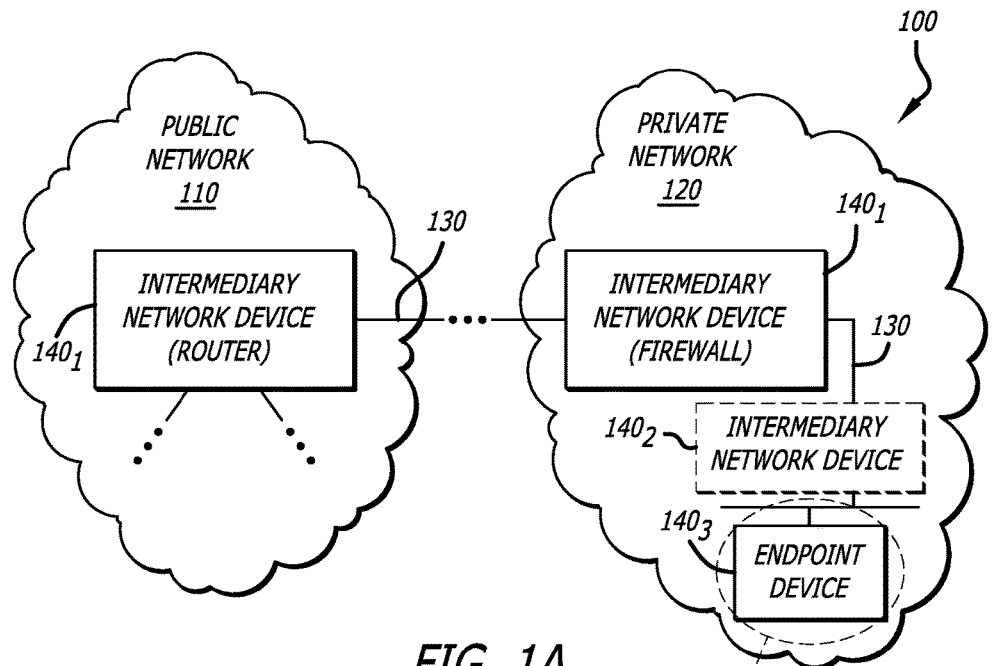
FIG. 1A is an exemplary block diagram of a system network that may be utilized by a computing device configured to support virtualization with enhanced security.

Various embodiments of the disclosure are directed to added functionality of the virtualization layer to protect one or more processes running in a virtual machine from being compromised through a malicious attack. One of the processes (sometimes referred to as a "guest agent") is an instance of a software component that is instrumented as part of or operating in conjunction with either a guest operating system (OS) kernel or a guest OS software application. Alternatively, the guest agent may be implemented as a separate software component. Any of these implementations reside in a guest environment within the software virtualization architecture of a particular computing device.

The virtualization layer and the guest agent process are configured to monitor, perhaps on a continuous basis, for the presence of malicious activity inside the virtual machine. The presence of malicious activity may be detected from events that occur inside the virtual machine during its execution. According to one embodiment of the disclosure, the events may be traces of malicious activity that are detected during execution of the virtual machine, where the events may be caused by current processing of an object received over a network or uploaded from a stored medium. According to another embodiment of the disclosure, the events may be caused by a guest OS and one or more guest applications simulating processing of the object within an intended computing device.

For VM-based operations, the virtualization layer monitors events occurring during execution of the virtual machine and the guest agent process contributes certain metadata associated with these events. Provided to the virtualization layer in real-time or subsequently after detection of the events, the metadata, namely information that augments an understanding of particular events that suggest the presence of malware (e.g., origin of data being processed that is rendering the particular events, relationship of such data with other data, etc.), assists in the detection and classification of any uncovered anomalous behaviors associated with the events. It is contemplated that the virtualization layer may be configured to gather the metadata in lieu of the guest agent process.

Herein, the virtualization layer is a logical representation of at least a portion of a host environment. The host environment features a light-weight hypervisor (sometimes referred herein as a "micro-hypervisor") operating at a high privilege level (e.g., host mode, ring "0"). In general, the micro-hypervisor operates similar to a host kernel. The host environment further features a plurality of software components, generally operating as user-level virtual machine monitors (VMMs), which provide host functionality and operate at a lower privilege level (e.g. host mode, ring "3") than the micro-hypervisor.

II. Overview

According to one embodiment of the disclosure, the virtualization layer provides enhanced security of a software component (e.g., a guest agent) operating within a virtual machine, by protecting the integrity, confidentiality and availability of that software component. As an illustrative example, the integrity of the guest agent process is protected by limiting, at certain times, access to memory pages pertaining to code and/or data structures for the guest agent process. The confidentiality of the guest agent process is also protected by controlling access to some of these memory pages, notably those pages containing sensitive or confidential data (e.g., personal user data, financial data, etc.). Lastly, the availability of the guest agent process may be protected by guaranteeing some amount of execution time within the virtual machine, which may be achieved through an interrupt scheme between the virtualization layer and the guest agent process as described below.

Herein, according to one embodiment of the disclosure, the virtualization layer is configured with a first security mechanism to protect the integrity and confidentiality of a guest agent process by altering permissions set forth in the nested page tables, which may be directed to memory pages containing code (and/or data structures) pertaining to the guest agent process and/or metadata captured by that guest agent process. As a result, the page permissions associated with the second memory address translation (GPA-to-HPA) may be altered to be more stringent than the page permissions associated with the first memory address translation (GLA-to-GPA).

As an illustrative example, responsive to detecting that a guest agent process is "inactive" (e.g., not currently executing), permission adjustment logic within the virtualization layer may be configured to tighten page permissions associated with the second memory address translation. This temporarily precludes a certain type or types of accesses to memory pages that may contain code (and/or data structures) pertaining to the guest agent and/or metadata captured by that guest agent. As described below, the permission adjustment logic may be implemented within the guest monitor component, which is operating in concert with the micro-hypervisor.

According to one embodiment of the disclosure, the guest agent may be detected as being "inactive" upon (i) observing a guest process switch (e.g., change in the first data store, such as the processor control register CR3) and (ii) determining that the value loaded into the first data store does not correspond to the address space of the guest agent process. Likewise, the guest agent process may be detected as being "active" upon (i) observing a guest process switch and (ii) determining that the value loaded into the first data store corresponds to the address space of the guest agent process. As a result, in response to a guest process switch, when the guest monitor component of the virtualization layer observes the guest agent process is "inactive", the memory pages associated with the guest agent process may be read-only or may be hidden by removing read/write/execute permissions for these memory pages in the nested page tables (EPTs). The removal of the read/write/execute permissions for the above-identified memory pages effectively renders those memory pages completely inaccessible inside the VM. Similarly, when the guest monitor component of the virtualization layer observes the guest agent process is active, the page permissions are returned to less stringent permissions as may be found in the first memory address translation (e.g., read/write/execute or any combination thereof). Additionally, by tightening page permissions for an input/output memory management unit (IOMMU), we can also protect the agent's memory pages from DMA accesses.

More specifically, access to memory may be conducted in accordance with the use of the MMU or the IOMMU. A processor may be configured to conduct a memory page access based on a GLA-GPA-HPA translation process in the MMU. So by restricting the permissions in the nested page tables (EPT), the virtualization layer can restrict processor accesses to particular memory pages when certain guest processes are active/inactive. Additionally, device accesses (via a direct memory access) do not go through the MMU. Rather, such accesses are conducted through the IOMMU, which is positioned in the PCI root complex between the devices and the memory controller. The IOMMU uses page tables similar to the EPT, which can translate device-physical addresses to host-physical addresses and also control access permissions. DMA transactions rely on "read" and "write" operations, as there are no "execute" operations. Using the IOMMU, the virtualization layer can protect memory pages against DMA reads or writes. This could also be changed during a guest process switch, but typically guest agent pages may be set to be inaccessible to DMA for the lifetime of the agent process.

Indicating access privileges to memory pages associated with the guest agent, the page permissions include three access privileges: read permission "r" in which the contents of memory may be retrieved and made available in a perceivable format to the user; a write permission "w" in which the contents of memory may be retrieved and subsequently altered by the user; and an execute permission "x" in which the contents of memory may be retrieved and executed. Herein, when the guest agent process is inactive, for enhanced security, the write "w" permission may be removed from nested page table entries that are associated with memory pages containing code (and/or data structures) pertaining to the guest agent and/or metadata captured by that guest agent. Additionally, the execute "x" permission may be removed as well. At that time, the memory pages containing code (and/or data structures) pertaining to the guest agent and/or metadata captured by that guest agent include only read permission "r". It is contemplated that, when inactive, the memory pages associated with the guest agent process may be hidden (invisible inside the VM) by removal of all page permissions to these memory pages.

As an illustrative example, if the first memory address translation (GLA-to-GPA) is set as "rwx" (read/write/execute) and the second memory address translation (GPA-to-HPA) is altered and configured as "rx" (read/execute), then the effective end-to-end permissions will be "rx". For this example, the write "w" permission is removed by the permission adjustment logic in the virtualization layer (e.g., in guest monitor component) as paging control logic in the hardware processor conducts a logical AND of the permissions for both memory address translations. As a result, if the memory pages used for the GLA-to-GPA address translation include permissions "rwx" and the memory pages used for the GPA-to-HPA address translation include permissions "rx", the resultant permission for the guest agent will be "rx".

It is contemplated that page table manipulation is a privileged operation that requires ring-0 (kernel) privileges. The configuration of the guest page tables (GVA-to-GPA) may be conducted inside the guest kernel (Windows® kernel running in guest ring-0). The configuration of the nested page tables (GPA-to-HPA) may be performed by paging control logic inside the host kernel (hypervisor running in host ring-0), but may be handled by permission adjustment logic within the guest monitor component which has access to the paging control mechanism within the micro-hypervisor via an Application Programming Interface (API).

Additionally, operating as a user-level process in the guest OS, the guest agent process can be disabled like any other process. Given the complexity of internal data structures with the guest OS and the lack of disclosure of such internal data structures to third parties, the virtualization layer is not adapted to interfere with the scheduling or process management of the guest OS without risking a complete system breakdown. Accordingly, in accordance with a second security scheme, the kernel services operating in the guest OS are configured with an interrupt service routine (ISR) that guarantees execution time (availability) for the guest agent process inside the guest OS without modifying OS-internal data structures, such as process control blocks, scheduler run queue, or the like.

More specifically, an interrupt service routine (ISR) component may be deployed as a part of kernel services of the guest OS kernel. Additionally, all data structures related to interrupt delivery are protected, including an Interrupt Descriptor Table (IDT), a Global Descriptor Table "GDT", a Task State Segment (TSS), and/or the code/data/stack pages of the ISR. Such protection may be accomplished by controlling page permissions associated with ISR's memory pages in the nested page tables in accordance with the first security mechanism as described above.

In order to allocate guaranteed execution time to the guest agent process, interrupt injection logic is deployed within the guest monitor component and is configured to inject a virtual interrupt into the guest OS kernel, such as at a predetermined rate for example. The virtual interrupt will cause execution to vector to the protected ISR within the guest OS kernel at the next suitable point (e.g., the next instruction boundary executed inside the guest OS), provided the guest OS has interrupts enabled. The protected ISR can then perform selected operations, depending on whether the guest agent process is still running or has been disabled. These selected operations may include, but are not limited or restricted to (i) checking for the integrity of certain critical OS or guest agent data structures, (ii) verifying if the guest agent is still running, and/or (iii) restarting the guest agent process if necessary. Depending on the frequency of these virtual interrupts, the virtualization layer can control how often the guest agent process is provided control inside the guest environment. Unfortunately, the entire guest agent process cannot run as an ISR, because ISRs have to be short-running code paths. Fortunately, an attacker cannot disable the ISR because it would render the guest OS unstable.

III. Terminology

In the following description, certain terminology is used to describe features of the invention. For example, in certain situations, the terms "component" and "logic" are representative of hardware, firmware or software that is configured to perform one or more functions. As hardware, a component (or logic) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

A component (or logic) may be software in the form of one or more software modules, such as executable code in the form of an executable application, an API, a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "object" generally refers to a collection of data, whether in transit (e.g., over a network) or at rest (e.g., stored), often having a logical structure or organization that enables it to be classified for purposes of analysis for malware. During analysis, for example, the object may exhibit certain expected characteristics (e.g., expected internal content such as bit patterns, data structures, etc.) and, during processing, a set of expected behaviors. The object may also exhibit unexpected characteristics and a set of unexpected behaviors that may offer evidence of the presence of malware and potentially allow the object to be classified as part of a malicious attack.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may, according to one embodiment, include packets, frames, or cells. Further, an "object" may also refer to individual or a number of packets carrying related payloads, e.g., a single webpage received over a network. Moreover, an object may be a file retrieved from a storage location over an interconnect.

As a self-contained element, the object may be an executable (e.g., an application, program, segment of code, etc.) or a non-executable. Examples of non-executables may include a document (e.g., a Portable Document Format "PDF" document, Microsoft® Office® document, Microsoft® Excel® spreadsheet, etc.), an electronic mail (email), downloaded web page, or the like.

The term "computing device" should be construed as electronics with the data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: an endpoint device (e.g., a laptop, a smartphone, a tablet, a desktop computer, a netbook, a medical device, or any general-purpose or special-purpose, user-controlled electronic device configured to support virtualization); a server; a mainframe; a router; or a security appliance that includes any system or subsystem configured to perform functions associated with malware detection and may be communicatively coupled to a network to intercept data routed to or from an endpoint device.

The term "malware" is directed to software that produces an undesired behavior upon execution, where the behavior is deemed to be "undesired" based on customer-specific rules, manufacturer-based rules, and any other type of rules formulated by public opinion or a particular governmental or commercial entity. This undesired behavior may include a communication-based anomaly or an execution-based anomaly that would (1) alter the functionality of an electronic device executing an application software in a malicious manner; (2) alter the functionality of an electronic device executing that application software without any malicious intent; and/or (3) provide an unwanted functionality which is generally acceptable in other context.

The term "interconnect" may be construed as a physical or logical communication path between two or more computing platforms. For instance, the communication path may include wired and/or wireless transmission mediums. Examples of wired and/or wireless transmission mediums may include electrical wiring, optical fiber, cable, bus trace, a radio unit that supports radio frequency (RF) signaling, or any other wired/wireless signal transfer mechanism.

The term "computerized" generally represents that any corresponding operations are conducted by hardware in combination with software and/or firmware. Also, the term "agent" should be interpreted as a software component that instantiates a process running in a virtual machine. The agent may be instrumented into part of an operating system (e.g., guest OS) or part of an application (e.g., guest software application). The agent is configured to provide metadata to a portion of the virtualization layer, namely software that virtualizes certain functionality supported by the computing device.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

IV. General Architecture

Referring to FIG. 1A, an exemplary block diagram of a system network 100 that may be utilized by a computing device configured to support virtualization with enhanced security is described herein. The system network 100 may be organized as a plurality of networks, such as a public network 110 and/or a private network 120 (e.g., an organization or enterprise network). According to this embodiment of system network 100, the public network 110 and the private network 120 are communicatively coupled via network interconnects 130 and intermediary computing devices $140_1$, such as network switches, routers and/or one or more malware detection system (MDS) appliances (e.g., intermediary computing device $140_2$) as described in co-pending U.S. Patent Application entitled "Microvisor-Based Malware Detection Appliance Architecture" (U.S. patent application Ser. No. 14/962,497), the entire contents of which are incorporated herein by reference. The network interconnects 130 and intermediary computing devices $140_1$, inter alia, provide connectivity between the private network 120 and a computing device $140_3$, which may be operating as an endpoint device for example.

The computing devices $140_i$ (i=1, 2, 3) illustratively communicate by exchanging packets or messages (i.e., network traffic) according to a predefined set of protocols, such as the Transmission Control Protocol/Internet Protocol (TCP/IP). However, it should be noted that other protocols, such as the HyperText Transfer Protocol Secure (HTTPS) for example, may be advantageously used with the inventive aspects described herein. In the case of private network 120, the intermediary computing device $140_1$ may include a firewall or other computing device configured to limit or block certain network traffic in an attempt to protect the endpoint devices $140_3$ from unauthorized users.

Figure 1B:
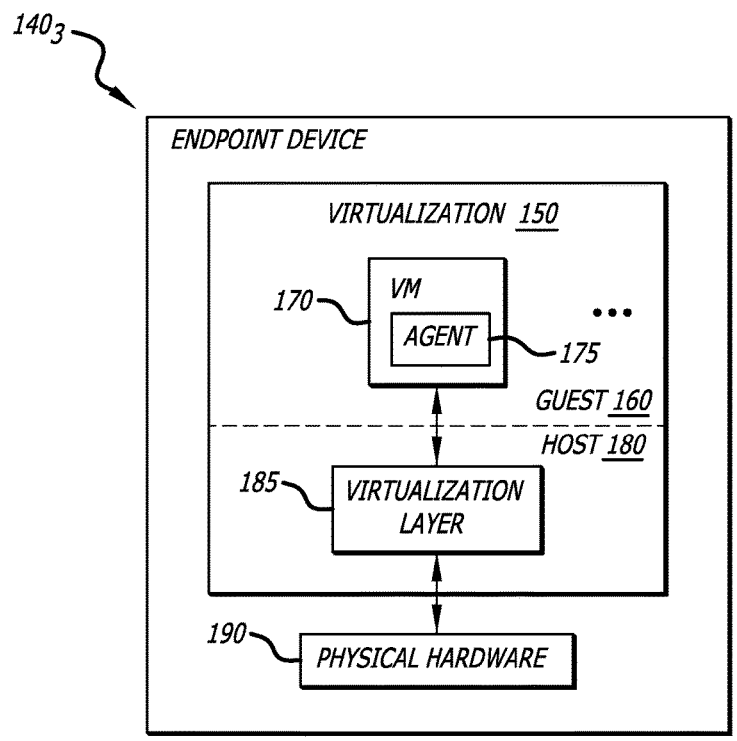
FIG. 1B is a high-level exemplary block diagram of a logical representation of the endpoint device of FIG. 1A.

As illustrated in FIG. 1B in greater detail, the endpoint device $140_3$ supports virtualization 150 that comprises a guest environment 160 and a host environment 180. As shown, the guest environment 160 comprises one or more virtual machines 170 (referred to herein as "virtual machine (s)"). Certain components operating within the virtual machine(s) 170, which is sometimes referred to as a "guest agent" 175, may be configured to monitor and store metadata (e.g., state information, memory accesses, process names, etc.) associated with analyzed content and/or events that may be associated with malicious activity. The metadata is provided to a virtualization layer 185 deployed within the host environment 180.

The virtualization layer 185 features a micro-hypervisor (not shown) with access to the physical hardware and one or more host applications running in the user space (not shown), which operate in concert to provide additional security to one or more software components (hereinafter "software component(s)") operating within the virtual machine(s) 170. The software component(s) may include guest agent 175 or software components within the guest operating system (OS) kernel such as an interrupt service routine (not shown). This additional security may be achieved by protecting the integrity, confidential and availability of the software component(s).

Figure 2:
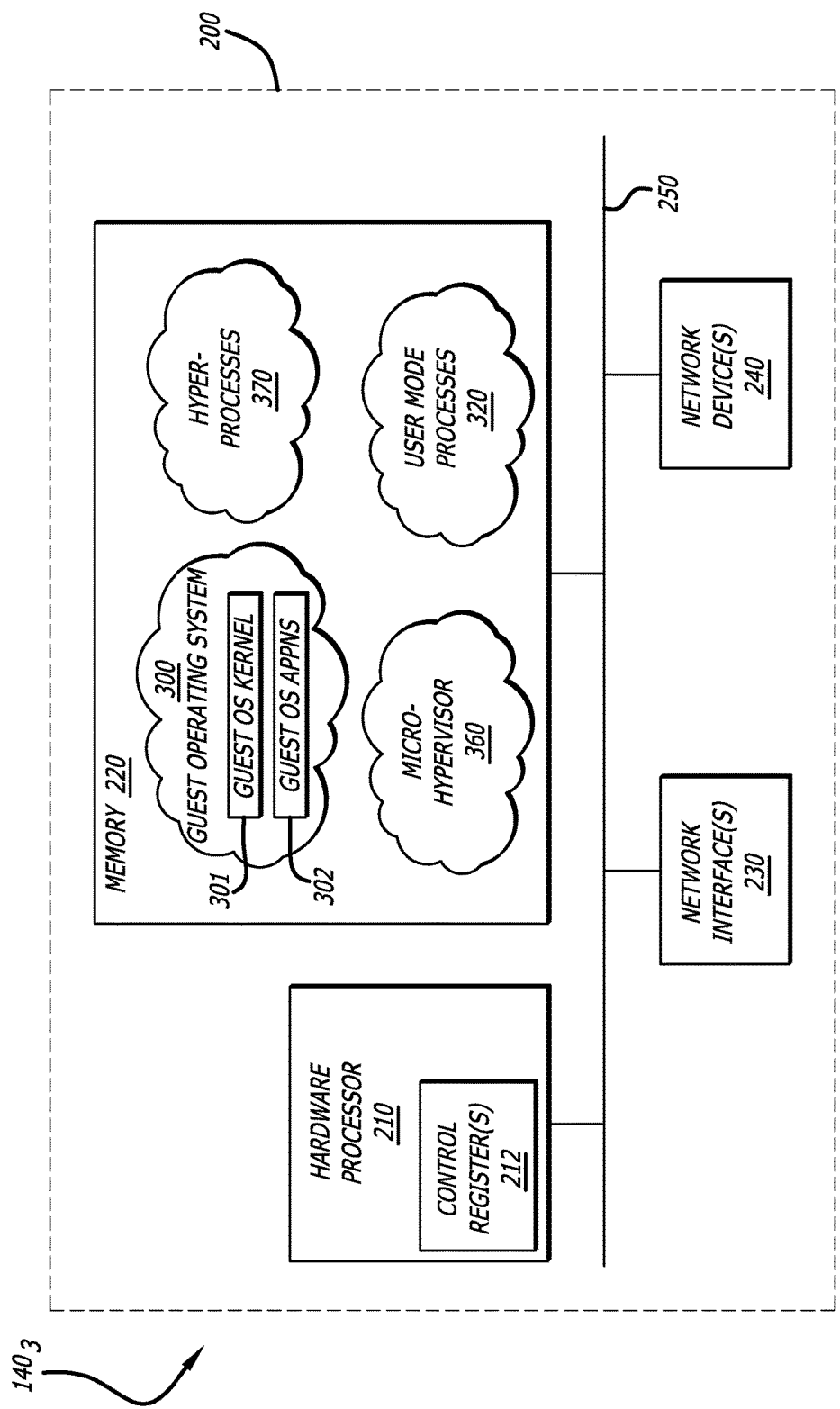
FIG. 2 is an exemplary block diagram of a physical representation of the endpoint device of FIG. 1B.

Referring now to FIG. 2, an exemplary block diagram of a logical representation of the endpoint device $140_3$ is shown. Herein, the endpoint device $140_3$ illustratively includes at least one hardware processor 210, a memory 220, one or more network interfaces (referred to as "network interface(s)") 230, and one or more network devices (referred to as "network device(s)") 240 connected by a system interconnect 250, such as a bus. These components are at least partially encased in a housing 200, which is made entirely or partially of a rigid material (e.g., hardened plastic, metal, glass, composite, or any combination thereof) that protects these components from atmospheric conditions.

The hardware processor 210 is a multipurpose, programmable device that accepts digital data as input, processes the input data according to instructions stored in its memory, and provides results as output. One example of the hardware processor 210 may include an Intel® x86 central processing unit (CPU) with an instruction set architecture. Alternatively, the hardware processor 210 may include another type of CPU, a digital signal processor (DSP), an application specific integrated circuit (ASIC), or the like.

According to one implementation, the hardware processor 210 may include one or more control registers 212 (e.g., CR3 register). The number of control registers 212 may depend on the number of processor cores within the hardware processor 210. For instance, each core may have its own CR3 register.

Herein, according to one embodiment of the disclosure, a first control register (CR3) is configured to store a guest page table pointer, which identifies a memory address location for a guest page table hierarchy for the currently active guest process, namely the guest page tables associated with a currently running guest process that is under control of the guest OS (e.g., Windows®-based process). Additionally, a second control register is configured to store a nested page table pointer (EPTP), which identifies a memory address location for a nested page table hierarchy for the currently active virtual machine, where the nested page table may apply page permission restrictions on certain memory pages in the nested page table, namely the memory pages corresponding to the guest agent process or any other protected process that are not active.

Herein, one or more of the control registers 212 may be context-switched between the host mode and the guest mode. Hence, when the hardware processor 210 is executing in guest mode, the CR3 register is loaded with the guest page table pointer as described above. However, in response to a VM Exit and the hardware processor 210 is executing in host mode, the CR3 register 212 points to the host page tables of the currently running hyper-process. The EPTP is not used in host mode unless multiple VMs are layered (e.g., a hypervisor is running inside the VM).

The nested page tables (EPT) control the GPA-HPA translation, and as such, configure the physical memory layout of the VM. They have no direct connection with guest processes. According to this embodiment of the disclosure, the EPT may be configured responsive to a guest process switch. As a result, different guest processes can see memory differently.

Reconfiguring the EPT responsive to an observed guest process switch can be performed in accordance with a number of approaches. One approach involves changing the translations and/or permissions in the currently active EPT. Another approach involves activating a different EPT (e.g., by loading a new nested page table pointer (EPTP) into the EPTP register), which may be preferable given that the switching frequency between "active" guest processes. The same switching operations are applicable to the DMA page tables in the IOMMU.

The network device(s) 240 may include various input/output (I/O) or peripheral devices, such as a storage device for example. One type of storage device may include a solid state drive (SSD) embodied as a flash storage device or other non-volatile, solid-state electronic device (e.g., drives based on storage class memory components). Another type of storage device may include a hard disk drive (HDD). Each network device 240 may include one or more network ports containing the mechanical, electrical and/or signaling circuitry needed to connect the endpoint device $140_3$ to the network 120 to thereby facilitate communications over the system network 110. To that end, the network interface(s) 230 may be configured to transmit and/or receive messages using a variety of communication protocols including, inter alia, TCP/IP and HTTPS.

The memory 220 may include a plurality of locations that are addressable by the hardware processor 210 and the network interface(s) 230 for storing software (including software applications) and data structures associated with such software. The hardware processor 210 is adapted to manipulate the stored data structures as well as execute the stored software, which includes an operating system (OS) 300 that includes a (guest) OS kernel 301 and one or more guest OS applications 302; user mode processes 320; a micro-hypervisor 360; and/or hyper-processes 370.

Herein, the hyper-processes 370 are instances of software program code (e.g., user-space applications operating as user-level VMMs) that are isolated from each other and run in separate (host) address spaces. In communication with the micro-hypervisor 360, the hyper-processes 370 are responsible for controlling operability of the endpoint device $140_3$, including policy and resource allocation decisions, maintaining logs of monitored events for subsequent analysis, managing virtual machine (VM) execution, and managing malware detection and classification.

The micro-hypervisor 360 is disposed or layered beneath the guest OS kernel 301 of the endpoint device $140_3$. The micro-hypervisor 360 is the only component that runs in the most privileged processor mode (host mode, ring-0). As part of a trusted computing base of most components in the computing platform, the micro-hypervisor 360 is configured as a light-weight hypervisor (e.g., less than 10K lines of code), thereby avoiding inclusion of complex, potentially exploitable virtualization code in an operating system (e.g., x86 virtualization code).

The micro-hypervisor 360 generally operates as the host kernel that is devoid of policy enforcement; rather, the micro-hypervisor 360 provides a plurality of mechanisms that may be used by the hyper-processes 370 for controlling operability of the virtualization architecture. These mechanisms may be configured to control communications between separate protection domains (e.g., between two different hyper-processes 370), coordinate thread processing within the hyper-processes 370 and virtual CPU (vCPU) processing within the VM 170, delegate and/or revoke hardware resources, and control interrupt delivery and DMA, as described below.

The guest OS kernel 301, portions of which are resident in memory 220 and executed by the hardware processor 210, functionally organizes the endpoint device $140_3$ by, inter alia, invoking operations in support of guest applications executing on the endpoint device $140_3$. The guest OS kernel 301 may include, but is not limited or restricted to the following: (1) a version of the Windows® series of operating systems; (2) a version of the MAC OS® and IOS® series of operating systems; (3) a version of the Linux™ operating system; or (4) a version of the Android™ operating system, among others. Suitable application programs 320 may include Adobe Reader® and/or Microsoft Word®.

The guest user mode processes 320 constitute instances of the guest applications running their separate address space. Events (monitored behaviors) of an object that is processed by one of the user mode processes are monitored by a guest agent process, which provides metadata to at least one of the hyper-processes 370 and the micro-hypervisor 360 for use in malware detection.

V. Virtualization Architecture

Figure 3:
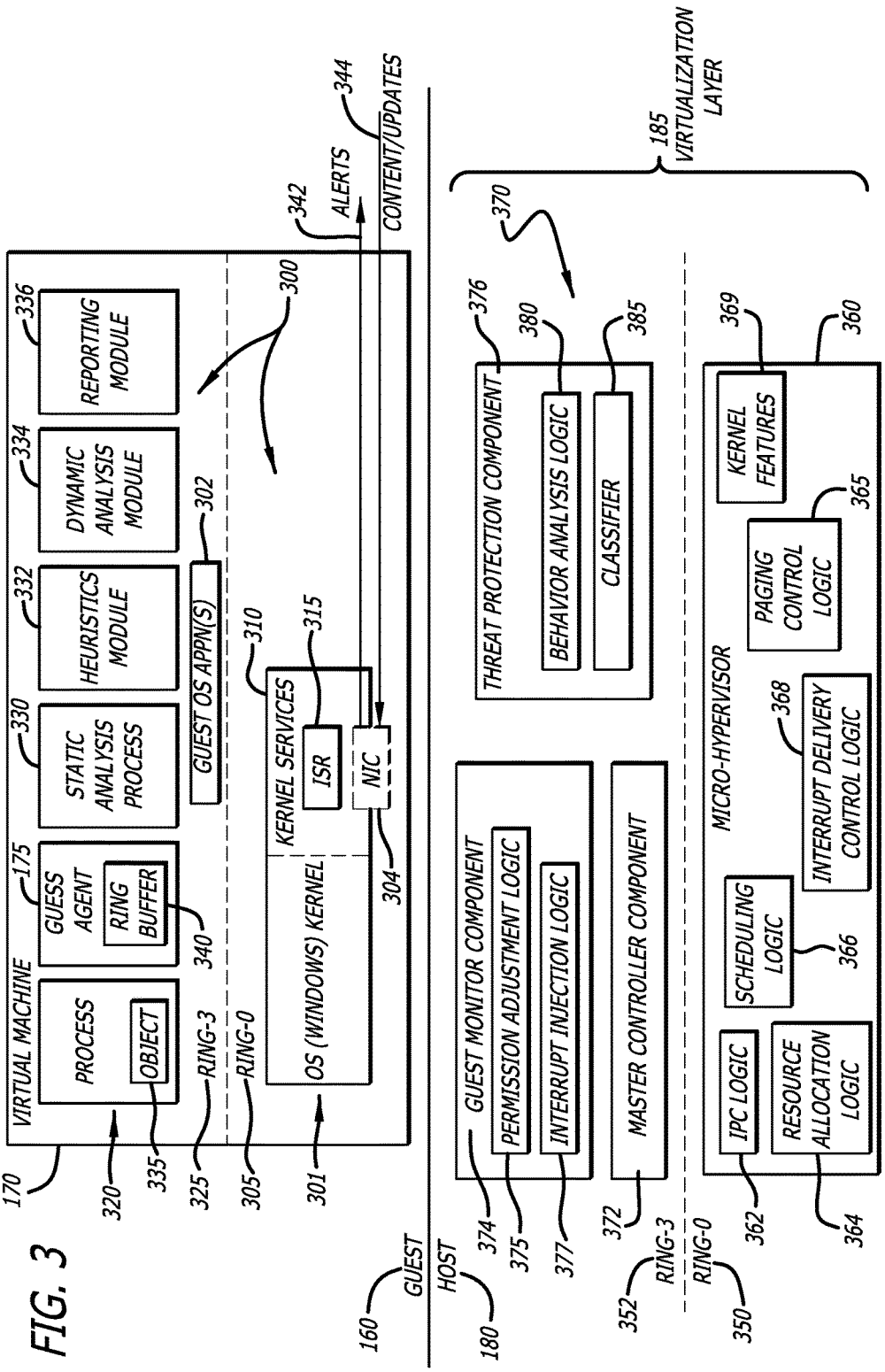
FIG. 3 is an exemplary embodiment of the virtualization of the endpoint device of FIG. 1B with enhanced security of processes and/or components residing in a virtual machine.

Referring now to FIG. 3, an exemplary embodiment of the software virtualization architecture 150 of the endpoint device $140_3$ with enhanced security of processes and/or components residing in a virtual machine is shown. The software virtualization architecture 150 comprises guest environment 160 and host environment 180, both of which may be configured in accordance with a protection ring architecture as shown. While the protection ring architecture is shown for illustrative purposes, it is contemplated that other architectures that establish hierarchical privilege levels for virtualized software components may be utilized.

A. Guest Environment

As shown, the guest environment 160 comprises at least one virtual machine 170, which analyzes an object 335 for the presence of malware or continuously analyses execution inside the virtual machine 170 for traces of malicious activity such as execution of user pages from kernel code, disabling certain protection features such as paging, overwriting buffers beyond their bounds, or the like. As shown, the virtual machine 170 features a guest OS kernel 301 that is running in the most privileged level (host mode, ring-0 305) along with one or more processes which are instances of software applications 320 (hereinafter "guest application process(es)") that are running in a lesser privileged level (host mode, ring-3 325). The guest application process(es) 320 may be based on the same software application, different versions of the same software application, or even different software applications, provided the guest software applications 320 may be controlled by the same guest OS kernel 301 (e.g., Windows® kernel).

It is contemplated that malware detection on the endpoint device $140_3$ may be conducted as a background process by one or more processes embodied as software components running with the virtual machine 170. These processes include a static analysis process 330, a heuristics process 332 and a dynamic analysis process 334, which collectively operate to detect suspicious and/or malicious behaviors by the object 335 during execution within the virtual machine 170. Notably, the endpoint device $140_3$ may feature data processing being implemented as its primary processing (e.g., in the foreground having majority use of endpoint resources) while malware detection may be implemented as background processing (i.e., minor use of endpoint resources).

In the alternative, however, the malware detection components could be implemented as part of or operate in conjunction with the same guest process, different modules in the guest OS kernel (or all in the same module), or different hyper-processes in the virtualization layer 185.

As used herein, the object 335 may include, for example, a web page, email, email attachment, file or universal resource locator. Static analysis may conduct a brief examination of characteristics (internal content) of the object 335 to determine whether it is suspicious, while dynamic analysis may analyze behaviors associated with events that occur during virtual execution of the object 335, especially a detected extended page table (EPT) violation where the object 335 is performing a memory access that the page permissions of the nested page tables prohibit (e.g., write data to a memory page that is "write protected"—namely the page without write "w" permission; execution from a page that is marked as non-executable in the nested page tables). These events are further made available to the threat protection component, as described below.

According to one embodiment of the disclosure, when applicable, the static analysis process 330 and the heuristics process 332 may conduct a first examination of the object 335 to determine whether it is suspicious and/or malicious. The static analysis process 330 and the heuristics process 332 may employ statistical analysis techniques, including the use of vulnerability/exploit signatures and heuristics, to perform non-behavioral analysis in order to detect anomalous characteristics (i.e., suspiciousness and/or malware) without execution (i.e., monitoring run-time behavior) of the object 335. For example, the static analysis process 330 may employ signatures (referred to as vulnerability or exploit "indicators") to match content (e.g., bit patterns) of the object 335 with patterns of the indicators in order to gather information that may be indicative of suspiciousness and/or malware. The heuristics module 332 may apply rules and/or policies to detect anomalous characteristics of the object 335 in order to identify whether the object 335 is suspect and deserving of further analysis or whether it is non-suspect (i.e., benign) and not in need of further analysis. These statistical analysis techniques may produce static analysis results (e.g., identification of communication protocol anomalies and/or suspect source addresses of known malicious servers) that may be provided to reporting module 336. The reporting module 336 generates a report (result data in a particular format) for transmission to a remotely located computing device such as MDS $140_2$ or another type of computing device.

More specifically, the static analysis process 330 may be configured to compare a bit pattern of the object 335 content with a "blacklist" of suspicious exploit indicator patterns. For example, a simple indicator check (e.g., hash) against the hashes of the blacklist (i.e., exploit indicators of objects deemed suspicious) may reveal a match, where a score may be subsequently generated (based on the content) by the threat protection component 376 to identify that the object may include malware. In addition to or in the alternative of a blacklist of suspicious objects, bit patterns of the object 335 may be compared with a "whitelist" of permitted bit patterns.

The dynamic analysis process 334 may conduct an analysis of the object 335 during processing (or analysis of events monitored during execution of the virtual machine 170), where the guest agent process 175 monitors the run-time behaviors of the object 335 and capture any resulting events that occur during run time. The events are provided to the host environment 180 via any communication channel, such as events stored within a ring buffer 340 of the guest agent 175 for example, for subsequent routing to and analysis by the threat protection component, as described below. In an embodiment, the dynamic analysis process 334 normally operates at least partially contemporaneously not generally wait for results from the static analysis process 330 and/or the heuristics process 332. During processing of the object 335, certain events may trigger page table violations that result in a VM exit to the host environment 180 for further analysis by the threat protection component 376.

1. Guest OS

In general, the guest OS 300 manages operability of the virtual machine 170, where some of these operations involve network connectivity, memory translation and interrupt service delivery and handling of these incoming service requests. More specifically, the guest OS kernel 301 of the guest OS 300 may receive an input/output (I/O) request from the object 335 being processed by one or more guest software applications 320, and in some cases, translates the I/O request into instructions. These instructions may be used, at least in part, by virtual system hardware (e.g., vCPU) to drive one or more network devices, such as a network interface card (NIC) for example, for establishing communications with other network devices. Upon establishing connectivity with the private network 120 and/or the public network 110 of FIG. 1, the network device $140_3$ may initiate alert messages 342 via reporting module 336 and the NIC 304 in response to detection that the object 335 is malicious. The alerts may be in any prescribed a message format (e.g., a Short Message Service "SMS" message, Extended Message Service "EMS" message, Multimedia Messaging Service "MMS", Email, etc.) or any other prescribed wired or wireless transmission format. Additionally, with network connectivity, the guest OS 300 may receive software updates 344 from administrators via the private network 120 of FIG. 1 or from a third party provider via the public network 110 of FIG. 1.

Another operation supported by the guest OS 300, such as the guest OS kernel 301 for example, involves the management of guest page tables, which are used as part of the two-step address translation process, to translate a guest-linear address (GLA) to a guest-physical address (GPA). The GLA along with the value of a processor control register (e.g., CR3 register) is used to produce GPA, which operates as an index for the recovery of the host physical address (e.g., the actual address for the data in physical memory).

Lastly, kernel services 310 within the guest OS kernel 301 is configured with an Interrupt Service Routine (ISR) 315 that supports one or more different types of interrupts, including network-based interrupts, graphics-based interrupts and kernel services interrupts. Since the guest agent process 175 may be turned off or halted through malicious attack prompted during processing of the object 335 within the VM 170, the kernel services interrupts are invoked by the guest monitor component 374, as described below, to ensure processing of the guest agent process 175 within the VM 170.

Issued by the guest monitor component 374, the kernel services interrupt represents a virtual interrupt that causes kernel services 310 to conduct a plurality of checks. One of these checks is directed to an analysis of the operating state of the guest agent process 175 (i.e., halted, disabled, in operation, etc.). Another check involves an evaluation of data structures associated with the guest agent process 175 or other software components within the VM 170 to determine whether such data structures have been tampered. Another check involves an evaluation of critical guest OS data structures, such as a system call table (not shown) to determine if entry points for any of the system calls have been maliciously changed.

2. Guest Agent

According to one embodiment of the disclosure, the guest agent 175 is a software component configured to provide the virtualization layer 185 with metadata that may assist in the handling of exploit detection. Instrumented into a guest software application 320, guest OS kernel 301 or operating as a separate module, the guest agent 175 is configured to provide metadata to the virtualization layer 185 in response to at least one selected event.

Herein, the guest agent 175 comprises one or more ring buffers 340 (e.g., queue, FIFO, shared memory, buffer and/or registers), which records certain events that may be considered of interest for malware detection. Examples of these events may include information associated with a newly created process (e.g., process identifier, time of creation, originating source for creation of the new process, etc.), information about the type and location of certain data structures, information associated with an access to certain restricted port or memory address, or the like. The recovery of the information associated with the stored events may occur through a "pull" or "push" recovery scheme, where the guest agent 175 may be configured to download the metadata periodically or aperiodically (e.g., when the ring buffer 340 exceeds a certain storage level or in response to a request). The request may originate from the threat protection component 376 and is generated by the guest monitor component 374.

B. Host Environment

As further shown in FIG. 3, the host environment 170 features a protection ring architecture that is arranged with a privilege hierarchy from the most privileged level 350 (host mode, ring-0) to a lesser privilege level 352 (host mode, ring-3). Positioned at the most privileged level 350 (host mode, ring-0), the micro-hypervisor 360 is configured to directly interact with the physical hardware platform and its resources, such as hardware processor 210 or memory 220 of FIG. 2.

Running on top of the micro-hypervisor 360 in ring-3 352, a plurality of processes being instances of host applications (referred to as "hyper-processes" 370) communicate with the micro-hypervisor 360. Some of these hyper-processes 370 include master controller component 372, guest monitor component 374 and threat protection component 376. Each of these hyper-processes 372, 374 and 376 represents a separate software component with different functionality and is running in a separate address space. As these hyper-processes 370 are isolated from each other (i.e. not in the same binary), inter-process communications between the hyper-processes 370 are handled by the micro-hypervisor 360, but regulated through policy protection by the master controller component 372.

1. Micro-Hypervisor

The micro-hypervisor 360 may be configured as a lightweight hypervisor (e.g., less than 10K lines of code) that operates as a host OS kernel. The micro-hypervisor 360 features logic (mechanisms) for controlling operability of the computing device, such as endpoint device $140_3$ as shown. The mechanisms include inter-process communication (IPC) logic 362, resource allocation logic 364, scheduling logic 366 and interrupt delivery control logic 368, where all of these mechanisms are based, at least in part, on a plurality of kernel features—protection domains, execution context, scheduling context, portals, and semaphores (hereinafter collectively as "kernel features 369") as partially described in a co-pending U.S. Patent Application entitled "Microvisor-Based Malware Detection Endpoint Architecture" (U.S. patent application Ser. No. 14/929,821), the entire contents of which are incorporated herein by reference.

More specifically, a first kernel feature is referred to as "protection domains," which correspond to containers where certain resources for the hyper-processes 370 can be assigned, such as various data structures (e.g., execution contexts, scheduling contexts, etc.). Given that each hyper-process 370 corresponds to a different protection domain, a first hyper-process (e.g., master controller component 372) is spatially isolated from a second (different) hyper-process (e.g., guest monitor component 374). Furthermore, the first hyper-process is spatially isolated (with the address space) from the virtual machine 170 as well.

A second kernel feature is referred to as an "execution context," which features thread level activities within one of the hyper-processes (e.g., master controller component 372). These activities may include, inter alia, (i) contents of hardware registers, (ii) pointers/values on a stack, (iii) a program counter, and/or (iv) allocation of memory via, e.g., memory pages. The execution context is thus a static view of the state of a thread of execution.

Accordingly, the thread executes within a protection domain associated with that hyper-process of which the thread is a part. For the thread to execute on a hardware processor 210, its execution context may be tightly linked to a scheduling context (third kernel feature), which may be configured to provide information for scheduling the execution context for execution on the hardware processor 210. Illustratively, the scheduling context may include a priority and a quantum time for execution of its linked execution context on the hardware processor 210.

Hence, besides the spatial isolation provided by protection domains, the micro-hypervisor 360 enforces temporal separation through the scheduling context, which is used for scheduling the processing of the execution context as described above. Such scheduling by the micro-hypervisor 300 may involve defining which hardware processor may process the execution context (in a multi-processor environment), what priority is assigned the execution priority, and the duration of such execution.

Communications between protection domains are governed by portals, which represent a fourth kernel feature that is relied upon for generation of the IPC logic 362. Each portal represents a dedicated entry point into a corresponding protection domain. As a result, if one protection domain creates the portal, another protection domain may be configured to call the portal and establish a cross-domain communication channel.

Lastly, of the kernel features, semaphores facilitate synchronization between execution context on the same or on different hardware processors. The micro-hypervisor 360 uses the semaphores to signal the occurrence of hardware interrupts to the user applications.

The micro-hypervisor 360 utilizes one or more of these kernel features to formulate mechanisms for controlling operability of the endpoint device 200. One of these mechanisms is the IPC logic 362, which supports communications between separate protection domains (e.g., between two different hyper-processes 370). Thus, under the control of the IPC logic 362, in order for a first software component to communicate with another software component, the first software component needs to route a message to the micro-hypervisor 360. In response, the micro-hypervisor 360 switches from a first protection domain (e.g., first hyper-process 372) to a second protection domain (e.g., second hyper-process 374) and copies the message from an address space associated with the first hyper-process 372 to a different address space associated with the second hyper-process 374. The same mechanism can also be used for communicating between two execution controls in the same protection domain, in which case no address space switch occurs.

Another mechanism provided by the micro-hypervisor 360 is resource allocation logic 364. The resource allocation logic 364 enables a first software component to share one or more memory pages with a second software component under the control of the micro-hypervisor 360. Being aware of the location of one or more memory pages, the micro-hypervisor 360 provides the protection domain associated with the second software component access to the memory location(s) associated with the one or more memory pages.

Also, the micro-hypervisor 360 contains scheduling logic 366 that, when invoked, selects the highest-priority scheduling context and dispatches the execution context associated with the scheduling context. As a result, the scheduling logic 366 ensures that, at some point in time, all of the software components can run on the hardware processor 210 as defined by the scheduling context. Also, the scheduling logic 366 re-enforces that no component can monopolize the hardware processor 210 longer than defined by the scheduling context.

Lastly, the micro-hypervisor 360 contains an interrupt delivery control logic 368 that, when driven by the micro-hypervisor 360, any interrupts that occur are also delivered to the micro-hypervisor 360.

2. Master Controller

Referring still to FIG. 3, generally operating as a root task or init process, the master controller component 372 is responsible for enforcing policy rules directed to operations of the virtualization 150. This responsibility is in contrast to the micro-hypervisor 360, which provides mechanisms for inter-process communications and resource allocation, but does not dictate how and when such functions occur. For instance, the master controller component 372 may be configured to conduct a number of policy decisions, including some or all of the following: (1) memory allocation (e.g., distinct physical address space assigned to different software components); (2) execution time allotment (e.g., scheduling and duration of execution time allotted on a selected process basis); (3) virtual machine creation (e.g., number of VMs, OS type, etc.); and/or (4) inter-process communications (e.g., which processes are permitted to communicate with which processes, etc.).

Additionally, the master controller component 372 is responsible for the allocation of resources. Initially, the master controller component 372 receives access to most of the physical resources, except for access to security critical resources that should be driven by high privileged (host mode, ring-0) components, not user space (host mode, ring-3) software components such as hyper-processes 370. For instance, while precluded for access to the memory management unit (MMU) or the interrupt controller, the master controller component 372 may be configured to control selecting which software components are responsible for drive certain network devices.

The master controller component 372 is platform agnostic. Thus, the master controller component 372 may be configured to enumerate what hardware is available to a particular process (or software component) and to configure the state of the hardware (e.g., activate, place into sleep state, etc.).

By separating the master controller component 372 from the micro-hypervisor 360, a number of benefits are achieved. One inherent benefit is increased security. When the functionality is placed into a single binary (executable), which is running in host mode, any vulnerability may place the entire computing device at risk. In contrast, each of the software components within the host mode is running in its own separate address space.

3. Guest Monitor

Referring still to FIG. 3, the guest monitor component 374 is a user space application that is responsible for managing the execution of the virtual machine 170, which includes operating in concert with the threat protection component 376 to determine whether or not certain events, detected by the guest monitor component 374 during processing of the object 335 within the VM 170, are malicious.

In response an extended page table (EPT) violation, which causes a VM exit for the guest OS 300 to the virtualization layer 185, the guest monitor component 374 identifies that an unpermitted operation was attempted on a memory page associated with the nested page table. The presence of the trap may prompt the guest monitor component 374 to obtain and forward metadata associated with the EPT violation (as monitored by the guest agent 175) to the threat protection component 376. Based on the metadata, the threat protection component 376 determines if the event was malicious or not.

If the event was benign, although the page is access protected, the guest monitor component 374 may be responsible for emulating the attempted access. For instance, for an EPT violation triggered for a write-protection violation that is determined to be benign, the guest monitor component 374 would need to simulate the write access and its side effects.

As an illustrative example, it is noted that there are certain events that cause a VM exit (a transition of execution from the guest mode to the host mode). The guest monitor component 374 can configure, on an event basis, which events should trigger a transition from the guest mode to the host mode. One event may involve the execution of a privileged processor instruction by a vCPU within the virtual machine 170. In response to execution by the vCPU of a privileged instruction, the micro-hypervisor 360 gains control of the platform and generates a message to the guest monitor component 374, which is responsible for handling the event.

The guest monitor component 374 also manages permissions of the nested page tables under control of the virtualization layer. More specifically, the micro-hypervisor 360 includes a mechanism (i.e. paging control logic 365) to populate the nested page tables or ensures that no hyper-process can delegate resources that it does not have access to. In particular, no hyper-process is able to grant access to micro-hypervisor memory regions. The guest monitor component 374 features permission adjustment logic 375 that alters the page permissions. One technique in altering the page permissions may involve selecting a particular nested page table among multiple nested page tables, which provides the same memory address translation but is set with page permissions for the targeted memory pages that differ from page permissions for other nested page tables. Some of the functionality of the permission adjustment logic 375 may be based, at least in part, on functionality within paging control logic 365 that is accessible via an API (not shown).

The guest monitor component 374 also includes interrupt injection logic 377, which is responsible for handling the injection of virtual interrupts to the ISR 315 within the kernel services 310. The virtual interrupts are intended for the ISR agent 315 to assume control over certain operations of the virtual machine 170.

4. Threat Protection Component

As described above and shown in FIG. 3, detection of a suspicious and/or malicious object 335 may be performed by static and dynamic analysis of the object 335 within the virtual machine 170. Events associated with the process are monitored and stored by the guest agent process 175. Operating in concert with the guest agent process 175, the threat protection component 376 is responsible for further malware detection on the endpoint device 140$_3$ based on an analysis of events received from the guest agent process 175 running in the virtual machine 170.

After analysis, the detected events are correlated and classified as benign (i.e., determination of the analyzed object 335 being malicious is less than a first level of probability); suspicious (i.e., determination of the analyzed object 335 being malicious is between the first level and a second level of probability); or malicious (i.e., determination of the analyzed object 335 being malicious is greater than the second level of probability). The correlation and classification operations may be accomplished by a behavioral analysis logic 380 and a classifier 385. The behavioral analysis logic 380 and classifier 385 may cooperate to analyze and classify certain observed behaviors of the object (based on events) as indicative of malware. In particular, the observed run-time behaviors by the guest agent 175 are provided to the behavioral analysis logic 380 as dynamic analysis results. These events may include metadata and other information associated with an EPT violation that causes a VM exit to the virtualization layer that is delivered as an event to the guest monitor component 374. As a result, the guest monitor component 374 receives metadata associated with the events from the guest agent 175 and routes the same to the threat protection component 376.

At this time, the static analysis results and dynamic analysis results may be stored in memory 220, along with any additional metadata from the guest agent 175. These results may be provided via coordinated IPC-based communication to the behavioral analysis logic 380, which may provide correlation information to the classifier 385. Additionally or in the alternative, the results and/or events may be provided or reported via a network device initiated by the guest OS kernel to the MDS 140$_2$ for correlation. The behavioral analysis logic 380 may be embodied as a rules-based correlation engine illustratively executing as an isolated process (software component) that communicates with the guest environment 160 via the guest monitor component 374.

In an embodiment, the behavioral analysis logic 380 may be configured to operate on correlation rules that define, among other things, patterns (e.g., sequences) of known malicious events (if-then statements with respect to, e.g., attempts by a process to change memory in a certain way that is known to be malicious) and/or non-malicious events. The events may collectively correlate to malicious behavior. The rules of the behavioral analysis logic 380 may then be correlated against those dynamic analysis results, as well as static analysis results, to generate correlation information pertaining to, e.g., a level of risk or a numerical score used to arrive at a decision of (deduce) maliciousness.

The classifier 385 may be configured to use the correlation information provided by behavioral analysis logic 380 to render a decision as to whether the object 335 is malicious. Illustratively, the classifier 385 may be configured to classify the correlation information, including monitored behaviors (expected and unexpected/anomalous) and access violations, of the object 335 relative to those of known malware and benign content.

Periodically or aperiodically, rules may be pushed from the MDS 140$_2$ to the endpoint 140$_3$ to update the behavioral analysis logic 380, wherein the rules may be embodied as different (updated) behaviors to monitor. For example, the correlation rules pushed to the behavioral analysis logic 380 may include, for example, rules that specify a level of probability of maliciousness, whether a running process or application program has spawned processes; requests to use certain network ports that are not ordinarily used by the application program; or attempts to access data in memory locations not allocated to the guest application running the object. Alternatively, the correlation rules may be pulled based on a request from an endpoint device $140_3$ to determine whether new rules are available, and in response, the new rules are downloaded.

Illustratively, the behavioral analysis logic 380 and classifier 385 may be implemented as separate modules although, in the alternative, the behavioral analysis logic 380 and classifier 385 may be implemented as a single module disposed over (i.e., running on top of) the micro-hypervisor 360. The behavioral analysis logic 380 may be configured to correlate observed behaviors (e.g., results of static and dynamic analysis) with known malware and/or benign objects (embodied as defined rules) and generate an output (e.g., a level of risk or a numerical score associated with an object) that is provided to and used by the classifier 385 to render a decision of malware based on the risk level or score exceeding a probability threshold. The reporting module 336, which executes as a user mode process in the guest OS kernel 301, is configured to generate an alert for transmission external to the endpoint device $140_2$ (e.g., to one or more other endpoint devices, a management appliance, or MDS $140_2$) in accordance with "post-solution" activity.

VI. Virtualization Layer Security Mechanisms

According to one embodiment of the disclosure, the virtualization layer 185 provides enhanced security of a software component operating within a virtual machine by protecting the integrity, confidentiality and availability of that software component. For instance, the protected software component (e.g., guest agent process 175) may be a separate instance (as shown in FIG. 3), or instrumented as a portion or for operation in conjunction with a guest application 320 or guest OS kernel 301. A first security mechanism has been implemented to protect the integrity and confidentiality of the software component, while a second security mechanism has been implemented to protect the availability of the software component.

Figure 4:
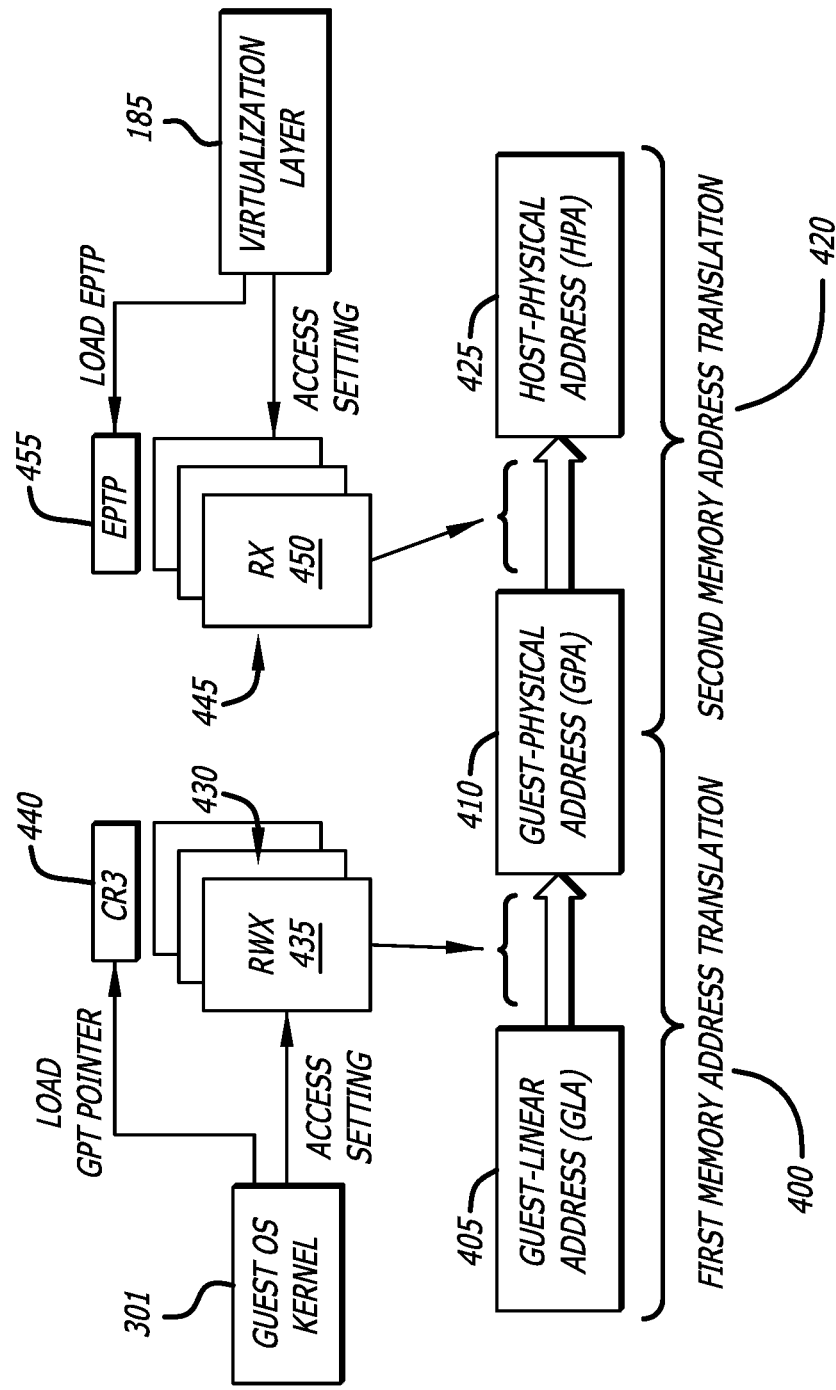
FIG. 4 is an exemplary embodiment of a page memory translation under control by the virtualization layer.

More specifically, as shown in FIGS. 3-4, in response to a memory access to virtual memory, a two-step memory address translation occurs. A first memory address translation 400 includes a translation from a guest-linear address (GLA) 405 to a guest-physical address (GPA) 410, and a second memory address translation 420 includes a translation from guest-physical address (GPA) 410 to host-physical address (HPA) 425.

As shown in FIG. 4, the first memory address translation (GLA-to-GPA) 400 is conducted through use of guest page tables 430, which are under control of the guest OS (e.g., Windows® OS, Linux™ OS, etc.). The particular guest page tables 435 targeted by the memory access are referenced (pointed to) by a value within a first data store (e.g., a first processor control register such as CR3 register 440), which is typically updated during a guest process switch.

The second memory address translation (GPA-to-HPA) 420 is conducted through use of nested page tables 445, sometimes referred to as extended page tables (EPTs), under the control of the virtualization layer 185 (e.g., the micro-hypervisor 360 and guest monitor component 374 of FIG. 3). The particular nested page tables 445 targeted by the memory access are referenced (pointed to) by a value within a second data store 455 (e.g., a second processor register such as an EPTP register), which is typically updated in response to an observed guest process switch, to activate a different set of nested page tables with different (overriding) permissions.

In general, the integrity and confidentiality of the guest agent process 175 is protected the first security mechanism that is configured to limit (or restrict) access, at certain times, to certain memory pages 450 that may contain code (and/or data structures) pertaining to the software component and/or metadata captured by that software component. These certain times are determined by monitoring for a change in the CR3 register 440 to/from a value corresponding to the protected software component.

According to one embodiment of the disclosure, access is mitigated to the guest agent process 175 by tightening page permissions for the memory pages 450, which are part of the nested page tables 445 associated with the GPA-to-HPA address translation 420, when the protected software component is inactive (e.g., non-execution state).

When in operation, in order to provide enhanced security to the computing device and protect the receipt of metadata into the virtualization layer, the first security mechanism is configured to (1) identify when a guest process change has occurred and (2) responsive to an identified guest process change, determine whether a different nested page table hierarchy from nested page tables 445 is needed for that active process. As described below in detail, the guest process change may be observed by detecting a guest process switch (e.g., a change in a specific data store such as processor control register "CR3" 440) or guest address space switch. In response to a guest process change, a change of the current nested page table hierarchy may be determined. The different nested page table hierarchies may correspond to different protection schemes, which are tailored for the particular active process. These protection schemes may remove some or all of the page permissions associated with the memory pages for one or more processes that are currently inactive.

For instance, no change may be necessary where the guest process switch identifies a change from a normal (non-protected) guest process to another normal guest process. However, a change may be necessary where the guest process switch identifies a change from a normal guest process to a protected guest process, between different protected guest processes, or from a protected guest process to a normal guest process.

In response to a memory access to virtual memory, a two-step memory address translation occurs within the virtualization architecture. As described below, a first memory address translation includes the GLA-to-GPA translation 400. Herein, the first memory address translation (GLA-to-GPA) 400 is conducted based on operations by the guest OS kernel 301 and a memory management unit "MMU" (not shown) of the physical hardware, which utilize a first data store (e.g., the CR3 register 440) in accordance with x86 processor architectures, to identify a memory address location for one or more guest page tables 430 associated with this particular memory access. The guest page tables 430 are data structures whose access is under control of the guest OS (e.g., Windows® OS, Linux™ OS, etc.) and accessible by the MMU that conducts the memory address translation.

More specifically, according to one embodiment of the disclosure, the guest OS kernel 301 is configured to generate and manage a plurality of guest page tables 430, namely a first guest page table hierarchy (e.g., at least a first guest page table 435) that is associated with a first process and a second guest page table hierarchy (e.g., at least a second guest page table) that is associated with another (second)

process. According to one embodiment, a single guest page table or a plurality of guest page tables may be referred to as a "guest page table hierarchy". The first data store 440 (e.g., CR3 register, specific memory address, etc.) is loaded with a guest page table pointer, namely a base (root) address pointer to a memory address location for a particular guest page table hierarchy associated with the active process that is accessing virtual memory.

Responsive to a memory address (GLA-to-GPA) translation conducted for a first (active) process, the MMU relies on the guest page table pointer stored in the first data store by the guest OS kernel 301 to locate the data structures for the first guest page table hierarchy. The MMU relies on the first guest page table hierarchy to translate a memory access by the first process from a guest-linear address (GLA) to the guest physical address (GPA). As the guest OS switches from the first process (now inactive) to a second process (now active), the guest OS kernel 301 alters the contents of the first data store 440 by storing a guest page table pointer that points to a second guest page table hierarchy corresponding to the second process.

Stated differently, according to one embodiment of the disclosure, the guest OS kernel 301 is configured to (i) modify the content within a guest page table hierarchy (one or more guest page tables) associated with the GLA-to-GPA translation 400 for any process and/or modify the access privileges for certain memory pages that are part of the guest page table hierarchy. The guest OS kernel 301 is also configured to change the guest page table pointer within the first data store in order to switch, when necessary, from one guest page table hierarchy associated with one process to another guest page table hierarchy associated with another process that is now active.

Additionally, a second memory address translation includes the GPA-to-HPA translation 420. The second memory address translation (GPA-to-HPA) is conducted through use of nested page tables 445 under the control of the virtualization layer 185 (e.g., the micro-hypervisor and guest monitor component described above). Sometimes referred to as an extended page table (EPT), a particular nested page table (e.g., nested page table 450) is referenced (pointed to) by an address pointer referred to as an "EPT pointer" (EPTP). The EPTP is stored in a second data store 455 (e.g., another processor control register other than CR3) that is accessible to one or more software components within the virtualization layer 185.

More specifically, according to one embodiment of the disclosure, the virtualization layer 185 is configured to (i) modify the content of one or more nested page tables 445 associated with the GPA-to-HPA translation 420 and/or the access privileges for certain memory pages that are part of these nested page tables 445, and (ii) change the EPTP in the second data store 455 to switch, when necessary and for the same virtual machine, from one nested page table to another nested page table. According to one embodiment, each nested page table may represent different protection levels (e.g., different page permissions). The EPTP corresponds to a base (root) address pointer for one or more nested page tables (i.e., nested page table hierarchy) for the currently active process.

Responsive to an observed guest process switch and based, at least in part, on which guest process is currently active, the virtualization layer 185 may be configured to select which of the nested page tables 445 are used for GPA-to-HPA translation 420. By selecting among a plurality of nested page tables based on the switched, active guest process, the access privileges (e.g., page permissions) for certain memory pages associated with a protected process (e.g., guest agent process) may be restricted when the active process is not that protected process. Similarly, the access privileges for certain memory pages may be set to unrestricted (normal) access privileges when the active process is that protected process (or one of the group of protected processes).

As an illustrative example, a first nested page table corresponds to the guest agent process being active and a second nested page table that corresponds to other processes. Hence, for the first nested page table, the page permissions for memory pages associated with the guest agent process are available and have not been overridden. For the second nested page table, however, the page permissions for memory pages associated with the guest agent process are protected by partially or completely removing certain page permissions (e.g., write permission removed, execute permission removed, both write and execute permissions removed, or all page permissions removed).

As another illustrative example, multiple processes may be protected, where some of these processes may have different protection schemes. For instance, one nested page table hierarchy corresponds to a first protected process (e.g. a guest agent process), while a second nested page table hierarchy corresponds to a second protected process (e.g., anti-virus process) and a third nested page table hierarchy corresponds to a third protected process (e.g., intrusion protection system). A fourth nested page table hierarchy corresponds to other processes. Hence, whenever a particular process is active in response to a guest process switch (and review of the content of the first data store such as the CR3 register), the corresponding nested page table hierarchy may be configured to remove (override) certain page permissions associated with the memory pages for any processes that are not currently active.

Figure 5:
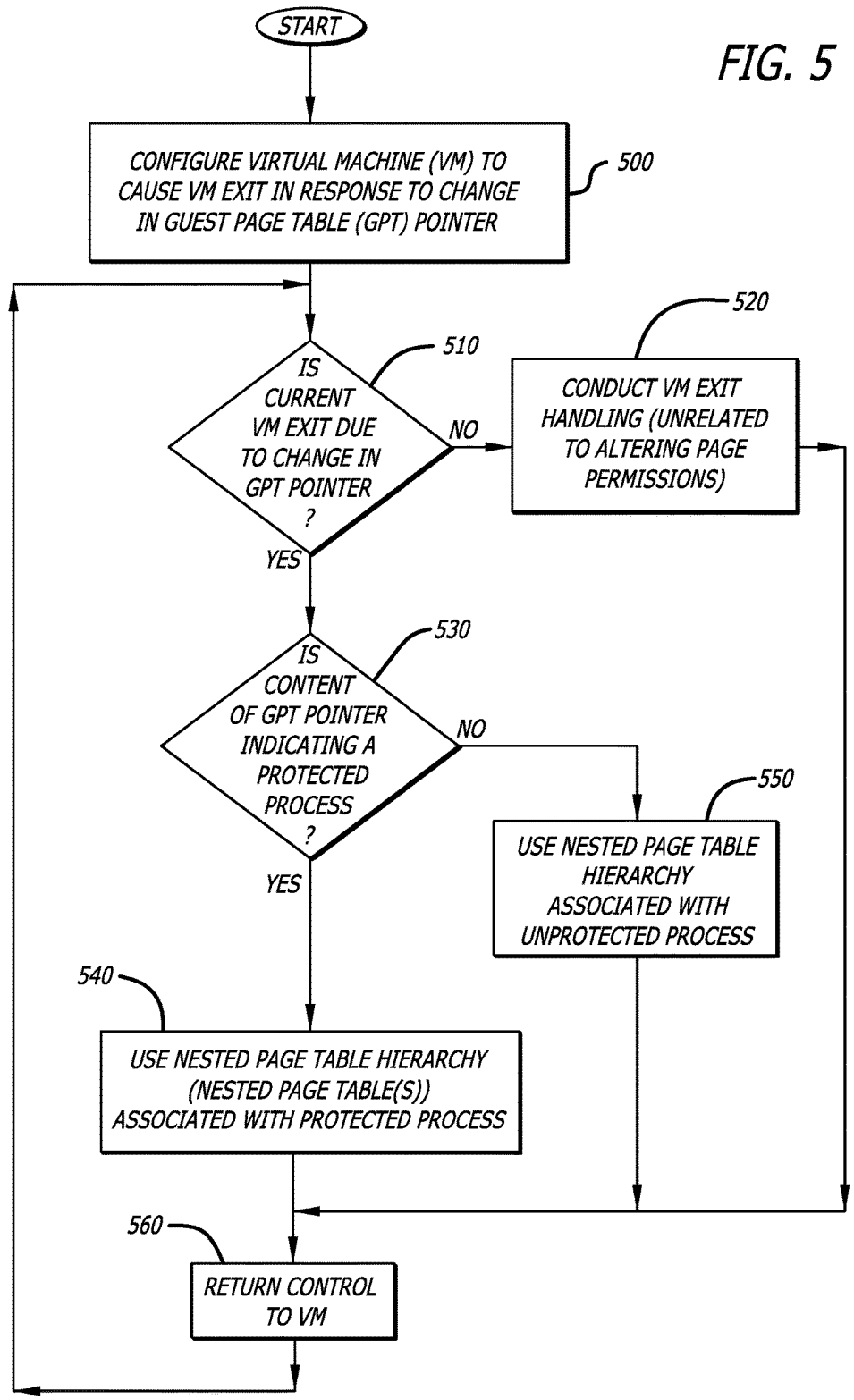
FIG. 5 is a flowchart of the operations associated with the first security protection scheme.

Referring to FIG. 5, a flowchart of the operations associated with the first security mechanism is shown. First, the virtualization layer configures the virtual machine (VM) to cause a VM exit in response to a change in the guest page table pointer (block 500). The change in the guest page table pointer may represent a guest process switch or a guest address-space switch.

Thereafter, in response to a VM Exit, the virtualization layer determines whether the VM Exit is due to a change in the guest page table (GPT) pointer (block 510). If not, the virtualization layer conducts VM Exit handling unrelated to nested page table selection and, upon completion, the virtualization layer returns control to the VM (blocks 520 and 560). However, if the virtualization layer determines that the VM Exit is due to a change in the guest page table (GPT) pointer, the virtualization layer determines whether the content of the GPT pointer indicates that the newly active guest process is a protected process, such as the guest agent process for example (block 530).

Where the newly active guest process is a protected process, the virtualization layer ensures that a nested page table hierarchy (e.g., one or more nested page tables) associated with the protected process is used by the MMU to complete the GPA-to-HPA memory address translation, where the nested page table for the protected process may impose permission overrides for certain memory pages belonging to any of the other/different protected processes (block 540). Thereafter, the virtualization layer returns control to the virtual machine (block 560), where the virtualization layer awaits another VM Exit.

However, where the newly active guest process is not a protected process, the virtualization layer ensures that a nested page table hierarchy (e.g., one or more nested page tables) associated with the particular (unprotected) process is used by the MMU to complete the GPA-to-HPA memory address translation (block 550). This nested page table hierarchy may impose page permission overrides, which may remove certain page permissions for memory pages associated with one or more protected processes. Thereafter, the virtualization layer returns control to the virtual machine (block 560).

Figure 6:
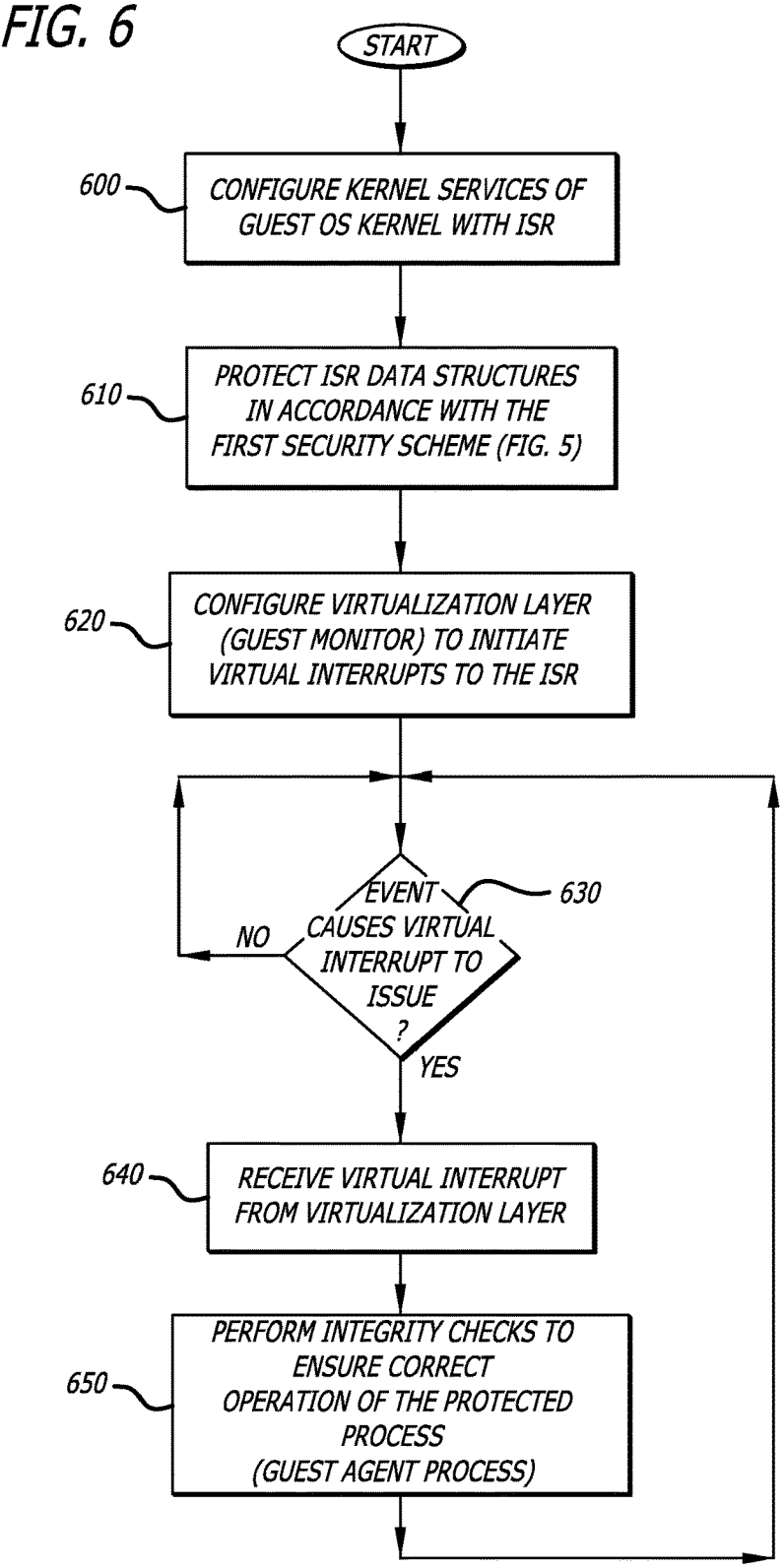
FIG. 6 is a flowchart of the operations associated with the second security protection scheme.

Referring now to FIG. 6, a flowchart of the operations associated with a second security scheme is shown. Herein, the second security scheme is directed to protecting a particular process to ensure that the protected process operating in the guest environment is not disabled by malware. Accordingly, kernel services operating in the guest OS kernel is configured with an interrupt service routine "ISR" (block 600). Additionally, the data structures related to interrupt delivery services, including an Interrupt Descriptor Table (IDT), a Global Descriptor Table "GDT", a Task State Segment (TSS), and/or the code/data/stack pages of the ISR, are protected in accordance with the first security mechanism as described above (block 610).

Also, in order to allocate guaranteed execution time to the agent, the guest monitor component is configured with interrupt injection logic to inject a virtual interrupt into the guest OS kernel that, when handled, causes the ISR to perform particular services (block 620). The frequency of the virtual interrupts may be periodic or perhaps aperiodic in nature. Furthermore, the services may vary, as the purpose for the interrupt is to ensure that the protected software component is not hijacked and disabled. The services may include, but are not limited or restricted to checking for the integrity of certain critical OS or data structures for the protected process, or requesting a response message from the protected process to verifying that it is not disabled.

After configuration, a determination is made as to whether an event has occurred to cause a virtual interrupt to be issued (block 630). For example, this operation may occur after a prescribed period of time has elapsed, when the frequency of the virtual interrupts is periodic. Similarly, this operation may occur in response to detection of a particular event (e.g., EPT violation) when the frequency of the virtual interrupts is aperiodic. The determination is iterative, until the virtual interrupt is to be issued. Thereafter, the virtual interrupt is received by the guest OS kernel, where the virtual interrupt will cause execution to vector to the protected ISR within the guest OS kernel at the next suitable point (block 640).

The protected ISR can then perform operations that are selected to cause operations to be conducted by the protected process (blocks 640 and 650). For instance, upon receipt of a first type of virtual interrupt, the ISR may check the integrity of certain critical OS data structures and/or data structures associated with the protected process in order to determine whether any of these data structures has been tampered with. Upon receipt of a second type of virtual interrupt, the ISR may check operability of the protected process and determine whether that process has been disabled. Upon receipt of a third type of virtual interrupt, the ISR may determine whether an entry within a system call table has altered to change an API call.

Thereafter, as shown, the second security scheme continues in an iterative manner to guarantee processing time for the protected software component.

In the foregoing description, the invention is described with reference to specific exemplary embodiments thereof. For instance, the first and second security mechanisms described above may be deployed in a MDS appliance instead of an endpoint device or in another computing device other than the MDS appliance and the endpoint device. It will, however, be evident that various modifications and changes may be made thereto without departing from the broader spirit and scope of the invention as set forth in the appended claims.

What is claimed is:

1. A computerized method for protecting processes operating within a computing device, comprising:
   identifying, by a virtualization layer operating in a host mode and being executed by hardware circuitry, when a guest process switch has occurred, the guest process switch corresponds to a change as to an operating state of a process within a virtual machine that is detected by (i) a change in a data store associated with the hardware circuitry and (ii) the data store stores a value different from an address space associated with the guest agent process; and
   responsive to the identified guest process switch, determining, by the virtualization layer, whether the hardware circuitry within the computing device is to access a different nested page table for use in memory address translations, wherein the different nested page table alters page permissions for one or more memory pages associated with one or more processes including the process that are executable in the virtual machine.

2. The computerized method of claim 1, wherein the determining whether the hardware circuitry within the computing device is to access the different nested page table for use in memory address translations comprises assigning the different nested page table that restricts the page permissions for the one or more memory pages associated with the process when the process transitions from an active operating state to an inactive operating state.

3. The computerized method of claim 1, wherein the identifying when the guest process switch has occurred comprises analyzing the change in content within the data store associated with the hardware circuitry that is executing the virtualization layer. The data store being a control register of a processor.

4. The computerized method of claim 1, wherein the determining whether the hardware circuitry within the computing device is to access the different nested page table comprises determining that the guest process switch identifies that the process is now inactive and removal of one or more page permissions for one or more memory pages associated with the process are to be performed.

5. The computerized method of claim 4, wherein one or more page permissions includes removal of a write permission for the one or more memory pages associated with the process.

6. The computerized method of claim 4, wherein one or more page permissions includes removal of a write permission, a read permission and an execute permission for the one or more memory pages associated with the process so that the one or more memory pages are inaccessible inside the virtual machine.

7. The computerized method of claim 1, wherein the determining whether the hardware circuitry within the computing device is to access the different nested page table comprises determining that the guest process switch identifies that the process is now inactive and altering one or more page permissions for one or more memory pages within a memory that handle a translation from a guest-physical address (GPA) to a host-physical address (HPA).

8. The computerized method of claim 1, wherein the process monitors and stores information associated with analyzed content or events that may be associated with malicious activity during processing of an object within the virtual machine.

9. The computerized method of claim 1, wherein the virtualization layer controls access by the hardware circuitry to the at least one different nested page table to restrict the page permissions for the one or more memory pages associated with the guest agent process when the content of the data store corresponding to an address space different than the address space associated with the guest agent process.

10. A computing device, comprising:
a hardware processor including a control register;
a memory coupled to the hardware processor, the memory includes virtualization software that includes a virtual machine to operate in a guest mode and a virtualization layer to operate in a host mode,
wherein in response to detecting a guest process switch corresponding to a change to an operating state of a guest agent process within a virtual machine as being set into an inactive operating state, the virtualization layer, being executed by the processor, assigns a page table for use in memory address translations different than a page table currently in use, the different page table alters page permissions for one or more memory pages associated with the guest agent process, and
wherein the virtualization layer detects the guest process switch by detecting a change in content with the control register of the processor that is executing the virtualization layer and the virtualization layer assigns the different page table to restrict the page permissions for the one or more memory pages associated with the guest agent process when the content of the control register corresponds to an address space different than an address space associated with the guest agent process.

11. The computing device of claim 10, wherein the virtualization layer assigns the different page table that restricts the page permissions for the one or more memory pages associated with the guest agent process when the guest agent process transitions from an active operating state to the inactive operating state.

12. The computing device of claim 11, wherein the page permissions are restricted by removing a write permission for the one or more memory pages associated with the guest agent process.

13. The computing device of claim 11, wherein the page permissions are restricted by removing an execute permission for the one or more memory pages associated with the guest agent process.

14. The computing device of claim 11, wherein the page permissions are restricted by removing a write permission, a read permission and an execute permission for the one or more memory pages associated with the guest agent process so that the one or more memory pages are inaccessible inside the virtual machine.

15. The computing device of claim 10, wherein the virtualization layer detects the guest process switch by detecting a change in content with the control register of the processor that is executing the virtualization layer.

16. The computing device of claim 10, wherein the page permissions are restricted by a guest monitor component of the virtualization layer removing a write permission for the one or more memory pages associated with the guest agent process.

17. The computing device of claim 10, wherein the page permissions are restricted by a guest monitor component of the virtualization layer removing an execute permission for the one or more memory pages associated with the guest agent process.

18. The computing device of claim 10, wherein the page permissions are restricted by a guest monitor component of the virtualization layer removing a write permission, a read permission and an execute permission for the one or more memory pages associated with the guest agent process so that the one or more memory pages are inaccessible inside the virtual machine.

19. The computing device of claim 10, wherein the page table includes a first set of nested page tables include one or more memory pages within the memory to handle a first translation from a guest-physical address to a host-physical address and the different page table includes a second set of nested page tables include one or more memory pages within the memory to handle a second translation from a guest-physical address (GPA) to a host-physical address, the second transition being different from the first transition.

20. An endpoint device, comprising:
a system interconnect;
a hardware processor coupled to the system interconnect, the hardware processor includes a control register;
a network interface coupled to the system interconnect, the network interface being configured to transmit or receive messages in accordance with a selected communication protocol; and
a memory coupled to the system interconnect, the memory includes virtualization software that includes a virtual machine to operate in a guest mode and a virtualization layer to operate in a host mode,
wherein in response to detecting a guest process switch corresponding to a change to an operating state of a guest agent process within a virtual machine as being set into an inactive state, the virtualization layer, being executed by the processor, assigns at least one nested page table for use in memory address translations different than nested page tables currently in use, the at least one different nested page table restricting page permissions for one or more memory pages associated with guest agent process while being set into the inactive state, and
wherein the virtualization layer assigns the at least one different nested page table to restrict the page permissions for the one or more memory pages associated with the guest agent process when content of the control register corresponds to an address space different than an address space associated with the guest agent process.

* * * * *